(12) United States Patent
Bortnikov et al.

(10) Patent No.: US 11,030,263 B2
(45) Date of Patent: Jun. 8, 2021

(54) SYSTEM AND METHOD FOR UPDATING A SEARCH INDEX

(71) Applicant: Oath Inc., New York, NY (US)

(72) Inventors: Edward Bortnikov, Haifa (IL);
Yonatan Gottesman, Haifa (IL); Gali Sheffi, Kiryat Bialik (IL); Dmitry Basin, Petah Tikva (IL); Nandaja Ananthanarayanan, Sunnyvale, CA (US); Rakesh Chhabra, Sunnyvale, CA (US)

(73) Assignee: Verizon Media Inc., New York, NY (US)

( * ) Notice: Subject to any disclaimer, the term of this patent is extended or adjusted under 35 U.S.C. 154(b) by 475 days.

(21) Appl. No.: 15/977,492

(22) Filed: May 11, 2018

(65) Prior Publication Data
US 2019/0347360 A1    Nov. 14, 2019

(51) Int. Cl.
| | | |
|---|---|---|
| G06F 16/00 | (2019.01) | |
| G06F 16/9535 | (2019.01) | |
| G06F 17/18 | (2006.01) | |
| G06F 16/23 | (2019.01) | |
| G06F 16/31 | (2019.01) | |
| G06F 16/38 | (2019.01) | |
| G06F 16/17 | (2019.01) | |
| G06F 40/30 | (2020.01) | |

(52) U.S. Cl.
CPC ...... *G06F 16/9535* (2019.01); *G06F 16/1734* (2019.01); *G06F 16/23* (2019.01); *G06F 16/31* (2019.01); *G06F 16/381* (2019.01); *G06F 17/18* (2013.01); *G06F 40/30* (2020.01)

(58) Field of Classification Search
CPC ...... G06F 16/9535; G06F 40/30; G06F 16/23; G06F 16/31; G06F 16/381; G06F 16/1734; G06F 17/18; G06F 16/22; G06F 16/2272; G06F 16/00; G06F 16/33; G06F 16/24; G06F 16/835; G06F 16/951
See application file for complete search history.

(56) References Cited

U.S. PATENT DOCUMENTS

| | | | |
|---|---|---|---|
| 9,141,656 B1* | 9/2015 | Lopyrev | G06F 16/9535 |
| 10,275,449 B1* | 4/2019 | Hayes | G06F 16/24568 |
| 10,423,594 B2* | 9/2019 | Olivier | G06F 8/36 |
| 10,491,448 B2* | 11/2019 | Bradbury | H04N 21/47214 |
| 10,747,750 B2* | 8/2020 | Bortnikov | G06F 16/248 |
| 10,768,798 B1* | 9/2020 | Porath | G06T 11/206 |
| 2003/0149727 A1* | 8/2003 | Jaschek | H04N 21/47214 709/206 |
| 2007/0072678 A1* | 3/2007 | Dagres | G07F 17/32 463/42 |

(Continued)

*Primary Examiner* — Noosha Arjomandi
(74) *Attorney, Agent, or Firm* — Pillsbury Winthrop Shaw Pittman LLP

(57) ABSTRACT

Methods, systems, and programming for updating a search index are described herein. In a non-limiting embodiment, event data representing actions performed on a plurality of content items managed via the search index may be obtained. The event data may be filtered based on predetermined criteria to generate updated event data, where the updated event data represents relevant actions performed on at least one of the plurality of content items and are associated with the search index. An updated search index based on the updated event data may then be generated.

26 Claims, 18 Drawing Sheets

(56) References Cited

U.S. PATENT DOCUMENTS

| | | | |
|---|---|---|---|
| 2007/0198477 A1* | 8/2007 | Lawton | G06Q 30/018 |
| 2008/0270382 A1* | 10/2008 | Thomsen | G06F 16/256 |
| 2009/0327236 A1* | 12/2009 | Denney | G06F 16/90324 |
| 2011/0125728 A1* | 5/2011 | Smyros | G06F 16/13 707/711 |
| 2011/0258198 A1* | 10/2011 | Sun | G06F 16/9535 707/742 |
| 2011/0270820 A1* | 11/2011 | Agarwal | G06F 40/253 707/709 |
| 2012/0191716 A1* | 7/2012 | Omoigui | H01L 27/14647 707/740 |
| 2013/0054564 A1* | 2/2013 | Smyros | G06F 16/31 707/711 |
| 2013/0091452 A1* | 4/2013 | Sorden | G06N 5/04 715/771 |
| 2013/0124503 A1* | 5/2013 | Ishii | G06F 16/13 707/722 |
| 2014/0074629 A1* | 3/2014 | Rathod | G06Q 30/0277 705/14.73 |
| 2014/0351260 A1* | 11/2014 | Sundaram | G06F 21/00 707/741 |
| 2015/0347417 A1* | 12/2015 | Hohwald | G06F 16/24578 707/727 |
| 2017/0053005 A1* | 2/2017 | Smyros | G06F 16/248 |
| 2017/0206210 A1* | 7/2017 | Goikhman | H04N 21/23113 |
| 2018/0060325 A1* | 3/2018 | Taylor | G06F 16/2228 |
| 2018/0136983 A1* | 5/2018 | Bequet | G06F 16/9014 |
| 2018/0246969 A1* | 8/2018 | Hind | G06F 16/901 |
| 2018/0248886 A1* | 8/2018 | Hind | G06F 21/6209 |
| 2019/0108575 A1* | 4/2019 | Gupta | G06Q 30/0633 |

* cited by examiner

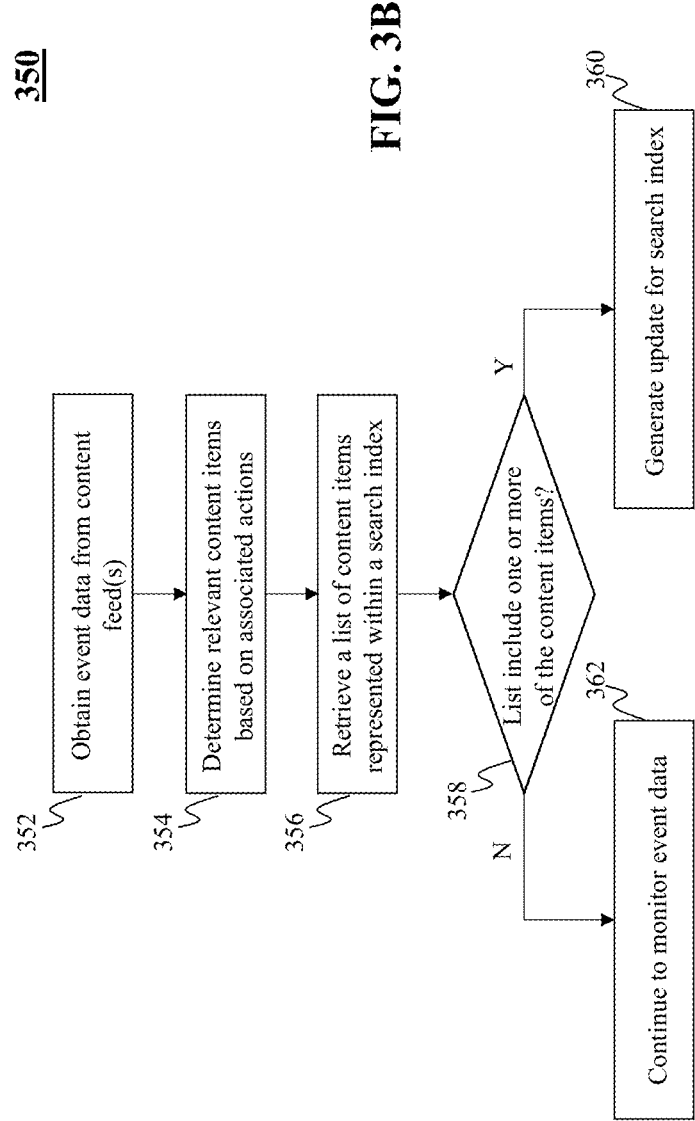

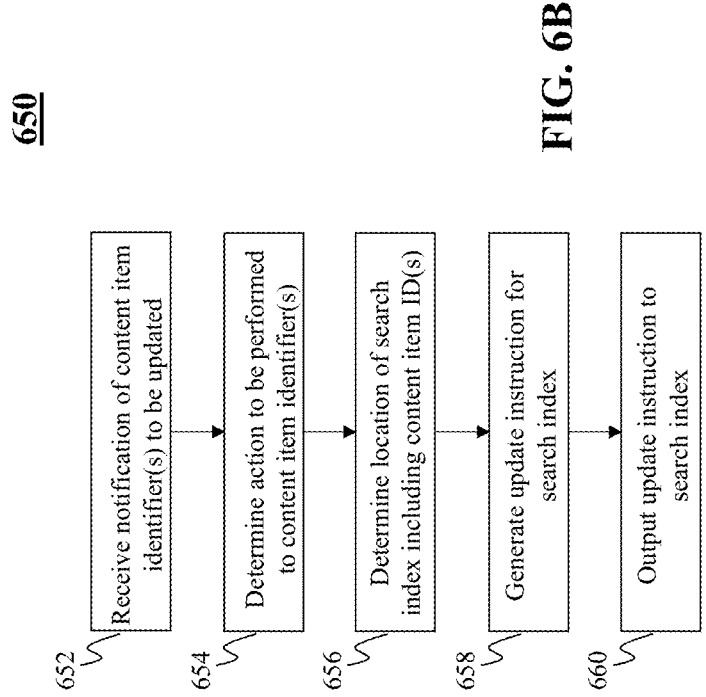

SYSTEM AND METHOD FOR UPDATING A SEARCH INDEX

BACKGROUND

1. Technical Field

The present teaching generally relates to searching. More specifically, the present teaching relates to systems, methods, and programming for updating a search index.

2. Technical Background

A search index allows for quick identification of content items that relate to a query. The search index includes a listing of content items that relate to different topics. When a user submits a query, content items may be identified quickly by scanning the search index. The search index, in one example, may be an inverted list of identifiers, each pointing to one particular content item. Each entry in the list is order by a relevancy score with respect to the query. Thus, the first identifier in the search index may point to a content item that is most relevant to the query, followed by a second identifier pointing to another content item having a relevancy less than or equal to the first content item. By storing identifiers pointing to content items as opposed to the content items themselves, the digital footprint within memory for the search index may be reduced.

The search index resides on an external platform, such as a web server, that may be interfaced by a user via a user device. When an action is performed to a content item (e.g., an email) on the user device, the action may be analyzed by a separate system, which may also generate and store a record of the action thereon. After storing the record of the action, the action may be propagated to the search index. For example, when an email is deleted at a user device, the mail server may store a record of the deletion action, and may propagate the event to the external platform storing the search index to cause the email's identifier to be removed from the search index. For each action performed, the search index will be interacted with.

The number of events that occur, even for a single user during a short amount of time, can still be quite voluminous. Applying each of these events to the search index, which is still live and being interacted with by a user, is computationally intensive, if not infeasible. Further complicating matters is that most of the events that occur are not relevant to the search index. For example, reading an email should not impact that email's representation within the search index, whereas a deletion of an email would impact the search index.

Thus, there is a need for methods and systems to filter out events so that the number and type of events that will be propagated to a search index's platform may be reduced.

SUMMARY

The teachings disclosed herein relate to methods, systems, and programming for updating a search index. More particularly, the present teaching relates to methods, systems, and programming related to generating an updated search index by filtering out irrelevant actions performed to content items.

In one example, a method implemented on at least one machine comprising at least one processor, memory, and a communication platform connected to a network for updating a search index is described. Event data representing actions performed on a plurality of content items managed via the search index may be obtained. The event data may be filtered based on pre-determined criteria to generate updated event data, wherein the updated event data represents relevant actions performed on at least one of the plurality of content items and are associated with the search index. An updated search index may be generated based on the updated event data.

In another example, a method implemented on at least one machine comprising at least one processor, memory, and a communication platform connected to a network for updating a search index is described. Event data representing actions performed on a plurality of content items managed via the search index may be obtained. The event data may be filtered based on pre-determined criteria to generate updated event data, wherein the updated event data represents relevant actions performed on at least one of the plurality of content items and are associated with the search index. The updated event data may be sent to a content grid for generating an updated search index.

In one example, a system for updating a search index is described. The system may comprise: memory comprising one or more computer program instructions, and at least one processor configured, upon execution of the one or more computer program instructions, to: obtain event data representing actions performed on a plurality of content items managed via the search index; filter the event data based on pre-determined criteria to generate updated event data, wherein the updated event data represents relevant actions performed on at least one of the plurality of content items and are associated with the search index; and generate an updated search index based on the updated event data.

In another example, a system for updating a search index is described. The system may comprise: memory comprising one or more computer program instructions, and at least one processor configured, upon execution of the one or more computer program instructions, to: obtain event data representing actions performed on a plurality of content items managed via the search index; filter the event data based on pre-determined criteria to generate updated event data, wherein the updated event data represents relevant actions performed on at least one of the plurality of content items and are associated with the search index; and send the updated event data to a content grid for generating an updated search index.

Other concepts relate to software for implementing the present teaching on updating a search index. A software product, in accord with this concept, includes at least one machine-readable non-transitory medium and information and/or instructions stored thereon. The instructions stored on the medium may include executable program code data, parameters in association with the executable program code, and/or information related to a user, a request, content, and/or information related to updating a search index.

In one example, a machine-readable, non-transitory and tangible medium having instructions recorded thereon for updating a search index is described. The instructions, when executed by at least one processor of a computing system, cause the computing system to: obtain event data representing actions performed on a plurality of content items managed via the search index; filter the event data based on pre-determined criteria to generate updated event data, wherein the updated event data represents relevant actions performed on at least one of the plurality of content items and are associated with the search index; and generate an updated search index based on the updated event data.

In one example, a machine-readable, non-transitory and tangible medium having instructions recorded thereon for updating a search index is described. The instructions, when executed by at least one processor of a computing system, cause the computing system to: obtain event data representing actions performed on a plurality of content items managed via the search index; filter the event data based on pre-determined criteria to generate updated event data, wherein the updated event data represents relevant actions performed on at least one of the plurality of content items and are associated with the search index; and send the updated event data to a content grid for generating an updated search index.

Additional novel features will be set forth in part in the description that follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2B is an illustrative flowchart of an exemplary process for outputting a response to a query, in accordance with various embodiments of the present teaching;

FIG. 3B is an illustrative flowchart of an exemplary process for determining whether an update to a search index is to be generated, in accordance with various embodiments of the present teaching;

FIG. 6B is an illustrative flowchart of an exemplary process for generating update instructions for a search index, in accordance with various embodiments of the present teaching;

DETAILED DESCRIPTION

Figure 1A:
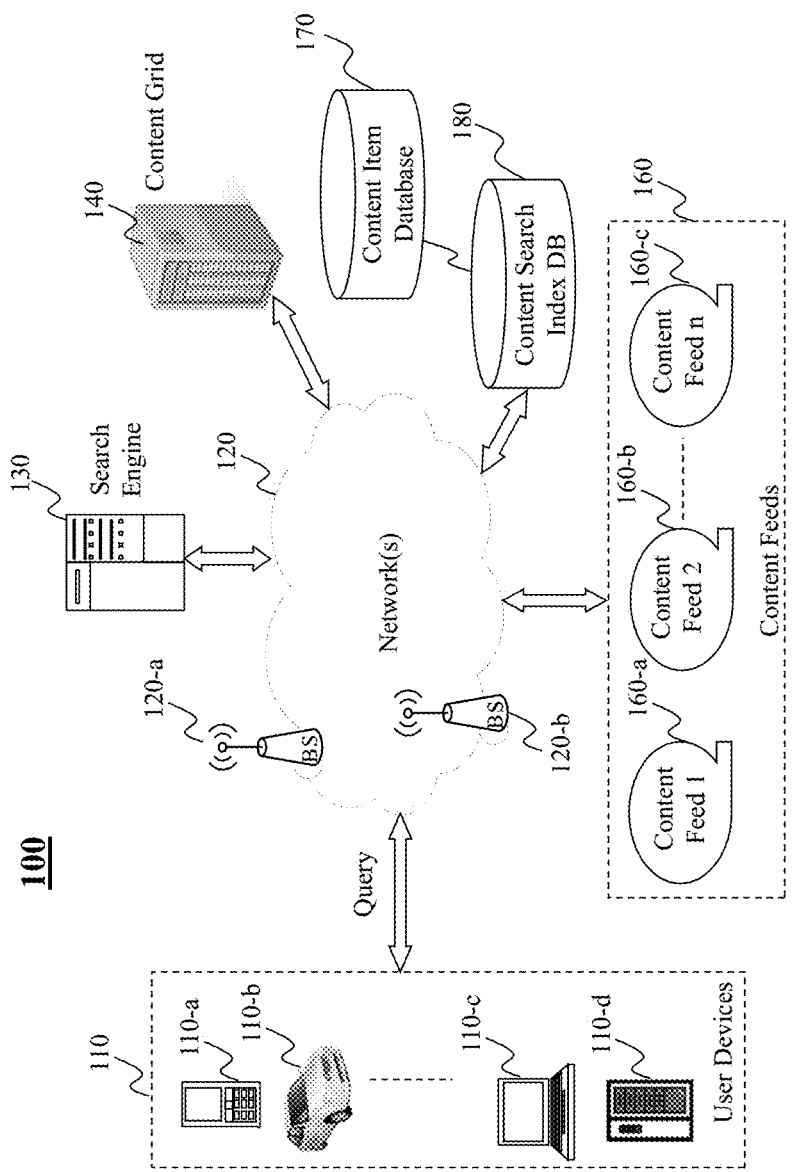
FIGS. 1A and 1B are illustrative diagrams of exemplary network environments for updating a search index, in accordance with various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to eliminate the limitations of associated with previous data pipeline systems. More specifically, the present teaching aims to describe systems, methods, and programming that reduce and/or minimize a number of calls to a search index. In particular, the number of calls to the search index may be reduced such that calls to the search index's external platform are made only for events relevant to the search index.

The search index commonly reside on an external platform. Therefore, accessing the external platform to apply each action performed to a content item to the search index may be unnecessary and computationally expensive. The present teaching allows for the events to be filtered such that only events whose actions affect the search index, as well as events whose associated content items likely are represented by the search index, are identified.

A "search index" or "content search index," which may be used herein interchangeably, may correspond to a list of content items and/or content item identifiers ("IDs") used for retrieving search results. In some embodiments, content item IDs included within the search index may be associated with a particular keyword and/or topic. When an individual inputs a query including one or more terms into a search input component (e.g., a search box of an email system), a corresponding search system may access the search index on the external platform, and may identify a posting list, or lists, associated with the query based on the query and/or the query's terms. The posting list may be scanned using any suitable search technique to identify the content item identified whose associated content items are determined to be most relevant to the query. For instance, a top-k content item identifiers, representing the top-k most relevant content item, may be identified from a posting list based on the query.

The content items identifiers, and thus the content items related thereto, included within a search index's posting list may be determined based on a content log. A content log may be populated by one or more content feeds (e.g., email systems, photo/image systems, etc.). For example, when a new email is received, that email, and thus the content of the email, may be stored within a content log. Semantic entities associated with the content items may be derived and/or extracted from the content log. The semantic entity/entities, and the corresponding content item extracted therefrom, may be stored within an extraction log. For example, an entity of "coupons," "flight itineraries," "contact information," and the like may be extracted from one or more content items in the content log. The extracted entities, and the content items that those entities were extracted from, may be used to generate and/or update a search index's posting list(s). In other words, each posting list included within the search index may be representative of the content items included within the content log and organized by different semantic entities. While the amount of content that is included within the content log may be fairly large, those content items that have extractable information may represent a small portion of the content items.

Each action that is performed to a content item (e.g., moving an email to a folder, deleting an email, reading an email, "liking" an image/video, tagging a content item, etc.) may also be recognized by a corresponding content feed. The content feed may populate an event log, which may store event data representing the actions that were performed to the various content items. Most actions are irrelevant to the corresponding content item's status within the search index. For instance, whether an email is read or unread should have little impact on that email's relevance to a search query, and thus the action of reading an email should not change a search index's posting list. However, a deletion of an email, for example, may impact a search index's posting list, as deleted emails should, in time, stop appearing within a search result list. Therefore, accessing the search index, which commonly resides on an external platform, for every action performed to a content item is not only computationally expensive, but is infeasible.

The present teaching generally describes systems, methods, and programming that filter out irrelevant events so that a minimum amount of communication with the search index occurs. In one example embodiment, a Bloom Filter is employed that tracks the contents of the search index. For instance, the Bloom Filter may include a list of content item identifiers representative of the content item identifiers included within the search index's posting list. The Bloom Filter may be built using the extracted information from the extraction log, and may further be stored within a content grid, along with the content log, extraction log, and event log. In other embodiments, however, the Bloom Filter may be built, maintained, and stored at the content feed.

When an action of a particular type is detected within the event log, a check may be made as to whether that event's corresponding content item is included within the Bloom Filter's list. If so, and the event action is of a particular type (e.g., email deletion), then an update to the search index reflective of the action that was performed to the content item and/or an updated search index, may be generated. If not, then the search index is not accessed. The employment of the Bloom Filter may allow the system to determine, with a high probability, whether the content item actually exists within the search index.

As described herein, the terms "content item" and "document" may be used herein interchangeably. Similarly, the terms "content item identifier" and "document identifier" may be used herein interchangeably.

Figure 1B:
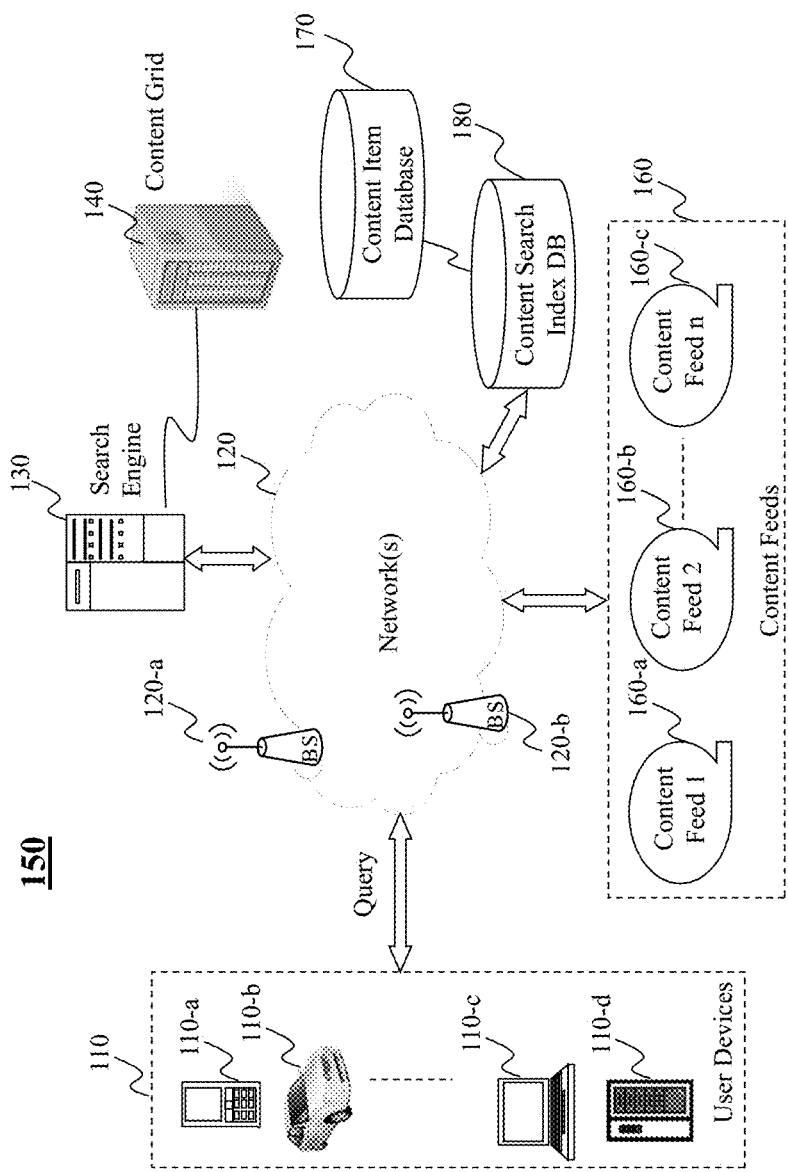

FIGS. 1A and 1B are illustrative diagrams of exemplary network environments for updating a search index, in accordance with various embodiments of the present teaching. In FIG. 1A, an exemplary networked environment 100 is described. Exemplary networked environment 100 may include one or more user devices 110, such as user devices 110-a, 110-b, 110-c, and 110-d, one or more content feeds 160, a search engine 130, a content grid 140, a content search index database 180, and a content item database 170, each of which may communicate with one another via one or more networks 120.

Network(s) 120, in some embodiments, may correspond to a single network or a combination of different networks. For example, network(s) 120 may be a local area network ("LAN"), a wide area network ("WAN"), a public network, a private network, a proprietary network, a Public Telephone Switched Network ("PSTN"), the Internet, an intranet, a wireless network, a virtual network, and/or any combination thereof. In one embodiment, network(s) 120 may also include various network access points. For example, environment 100 may include wired and/or wireless access points such as, and without limitation, base stations or Internet exchange points 120-a and 120-b. Base stations 120-a and 120-b may facilitate, for example, communications to/from user device(s) 110 and/or content grid 140 with one another as well as, or alternatively, one or more other components of environment 100 across network(s) 120.

User devices 110 may be of different types to facilitate one or more users operating user devices 110 to connect to network(s) 120. User devices 110 may correspond to any suitable type of electronic/computing device including, but not limited to, desktop computers 110-d, mobile devices 110-c (e.g., mobile phones, smart phones, personal display devices, personal digital assistants ("PDAs"), gaming consoles/devices, wearable devices (e.g., watches, pins/broaches, headphones, etc.), transportation devices 110-b (e.g., cars, trucks, motorcycles, boats, ships, trains, airplanes), mobile computers 110-c (e.g., laptops, ultrabooks), smart devices (e.g., televisions, set top boxes, smart televisions), smart household devices (e.g., refrigerators, microwaves, etc.), and/or smart accessories (e.g., light bulbs, light switches, electrical switches, etc.). A user, in one embodiment, may send data (e.g., a query) and/or receive data (e.g., a response) via user devices 110. For example, a user may speak, type, or otherwise input data representing a query (e.g., audio data representing an utterance including a query, text data representing a query, data representing a clickable search input, etc.) to their user device 110, which in turn may be communicated to search engine 130 and/or content grid 140 across network(s) 120.

Content feeds 160 may include one or more content feeds 160-1, 160-2, and 160-3, in some embodiments. Although three content feeds are shown within environment 100, any number of content feeds may be included. Content feeds 160 may correspond to any suitable content feed, such as a mail source, social networking source, image streaming source, and the like, and/or source, such as, and without limitation, an individual, a business, an organization, and the like. For example, content feeds 160 may correspond to an email service's system. In some embodiments, content feeds 160 may be vertical content sources. In one embodiment, each content feeds 160 may be configured to generate, receive, and/or send content to one or more of user devices 110, search engine 130, and/or content grid 140 via network(s) 120. The content (e.g., a webpage) may include information consumable by a user via their user device 110.

Search engine 130 may, in some embodiments, be configured to receive a query from a user device (e.g., user device 110), and may retrieve one or more search results based on the query. The search results may be provided to the user device that submitted the query. In some embodiments, search engine 130 may retrieve search results based on data stored within content search index database 180. For instance, content search index database 180 may include one or more search indices, which representing listing of content items and/or content item identifiers related to different keywords. Search engine 130 may, upon receipt of a query, analyze the query to determine one or more keywords included therein. After determining the keyword(s), one or more search indices may be identified, where each identified search index is related to one (or more) of the determined keywords. For example, if one of the keywords includes the term "coupons," then search engine 130 may identify a "coupon" search index within content search index database 180. Based on the search index's corresponding posting list (e.g., a list of content item identifiers ranked based on a content item's relevancy to that posting list's keyword(s)), one or more content item identifiers may be obtained. Continuing the above example, a top-k content item identifiers from the "coupon" posting list may be obtained. Based on these content item identifiers, the relevant content items (e.g., the content items that each content item identifier is associated with) may be retrieved from content item database 170, or links directed to those content items may be retrieved, and provided to user device 110 as a response to the input query. In some embodiments, content search index database 180 may store the corresponding content items locally, and may provide the content items to search engine 130. Further still, in some embodiments, only a single database may be employed that includes both content items and search indices.

Content grid 140 may, in some embodiments, be configured to execute one or more processes to identify relevant actions associated with content items, and cause an update to a search index to be generated in response. In some embodiments, content grid 140 may obtain event data representing actions performed to one or more content items. The event data may be received from content feed(s) 160. For instance, an individual may interact with one or more content items, such as emails, photos, documents, etc., on their user device 110. Each interaction may correspond to a type of action that may have a reciprocating effect on a search index. As an illustrative example, a deletion of an email by an individual via their user device may impact a search index for that individual's email account. In other words, when one deletes an email from their inbox, a subsequent search of their inbox should no longer include that deleted email. Thus, in this exemplary scenario, the deletion action should have an effect on the search index so that the deleted email is no longer represented within the search index.

Content grid 140, in one embodiment, may be configured to analyze the event data obtained from content feeds 160. Content grid 140 may then be configured to filter the event data base on some pre-determined criteria in order to generate updated event data. In the example embodiment, the pre-determined criteria may correspond to a determination that certain actions represented by the event data are of a particular type that impact a search index. For example, actions that may impact an email service's search index may include, but are not limited to, deletions of emails, receipt of new emails, moving of emails from one folder to another folder, and the like. Conversely, in the same context, some actions may not an email service's search index such as, and without limitation, reading of emails, marking of emails as being unread, marking an email as being important/unimportant, and the like.

Furthermore, in some embodiments, the pre-determined criteria may also correspond to a determination that one or more content items whose actions are of the type that impact the search index, are also included within a list of content items representative of the content items included within the search index. For instance, a Bloom Filter may be built and stored by content grid 140, which includes a list of content items that are likely present within the search index. Persons of ordinary skill in the art will recognize that although a Bloom Filter is described, any suitable filter or listing mechanism may be employed. A Bloom Filter, in one embodiment, may be used due to its high probability of being accurate, and the reasoning that there are substantially no false negatives, while minimal, if no, false positives.

Thus, when an action from the event data is analyzed, a determination may be made as to whether that action is part of the Bloom Filter's list, as well as whether that action corresponds to one of the predetermined actions that can impact the search index. If so, then content grid 140 may generate an update to the search index and/or generate an updated search index. The updated search index may then be provided to search engine 130, and thus content search index database 180, for use when user device 110 submits a query to middleware of search engine 130 to obtain search results. If, however, the action is not one of the predetermined actions that can impact the search index and/or the content item associated with the action is not part of the Bloom Filter's list, then content grid 140 may not perform an update to the search index, thereby reducing the number of calls that need to be made to the search index.

Although the aforementioned example embodiments have been described with processing and analysis of event data actions by content grid 140, persons of ordinary skill in the art will recognize that some or all of the aforementioned steps may be performed by content feeds 160. For instance, one or more of content feeds 160, as described below, may obtain event data representing actions performed to one or more content items. Content feed(s) 160 may then filter, based on pre-determined criteria, the event data to generate updated event data. Next, the updated event data may be sent to content grid 140 to generate an update for the search index and/or generate an updated search index.

Networked environment 150 of FIG. 1B, in one illustrative embodiment, may be substantially similar to networked environment 100 of FIG. 1A, with the exception that content grid 140 may connect to search engine 130 as a backend as opposed to via network(s) 120. Still, in other embodiments, content item database 170 and/or content search index database 180 may also connect to search engine 130 as a backend, as opposed to via network(s) 120. Still further, content grid 140 may connect to content feeds 160 as a backend as opposed to via network(s) 120. Persons of ordinary skill in the art will recognize that one or more features of content grid 140, search engine 140, content feeds 160, content item database 170, and/or content search index 180 may be stored locally by user device(s) 110.

Figure 2A:
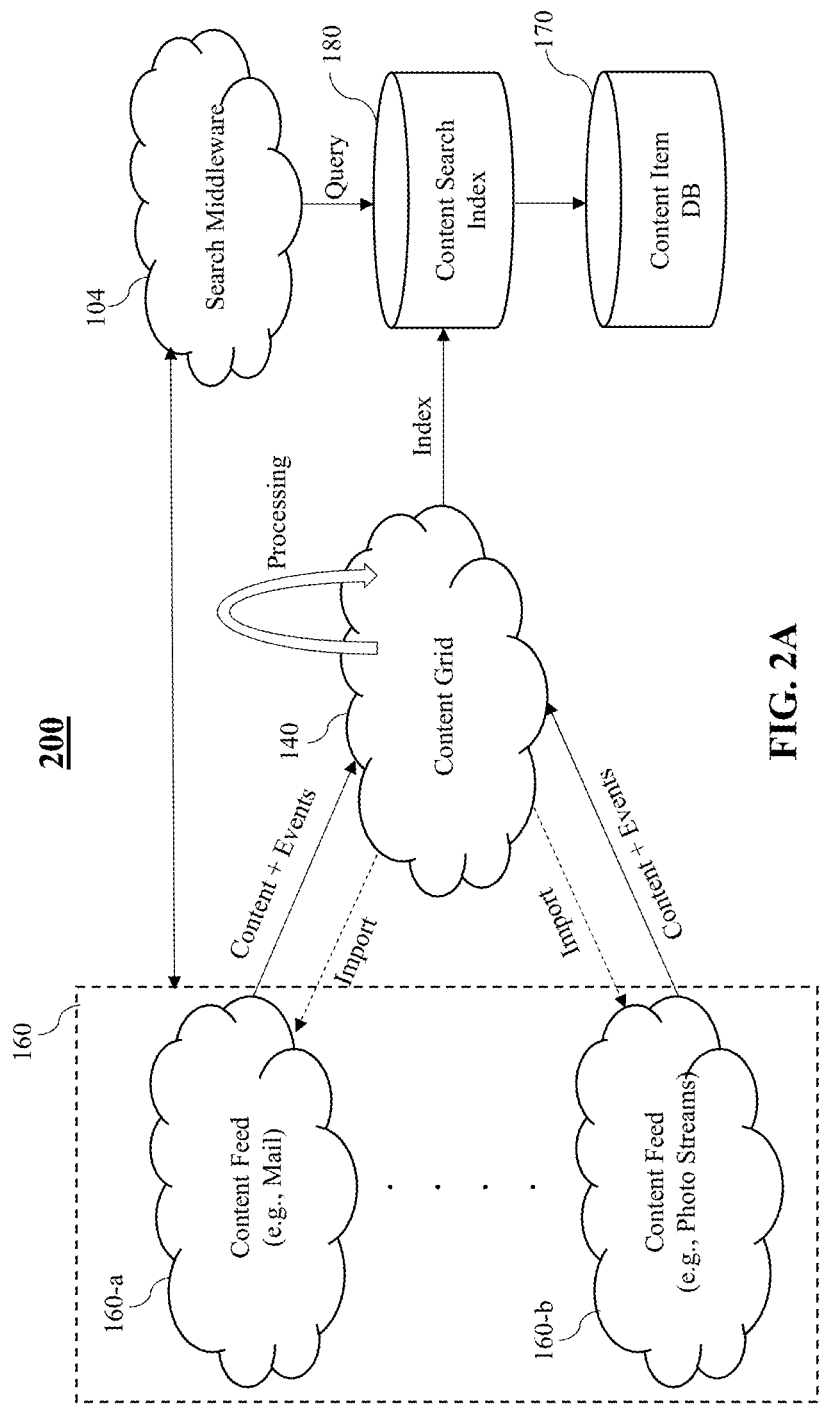
FIGS. 2A and 2B are illustrative diagrams of exemplary data pipelines and search indices, in accordance with various embodiments of the present teaching.
Figure 2B:
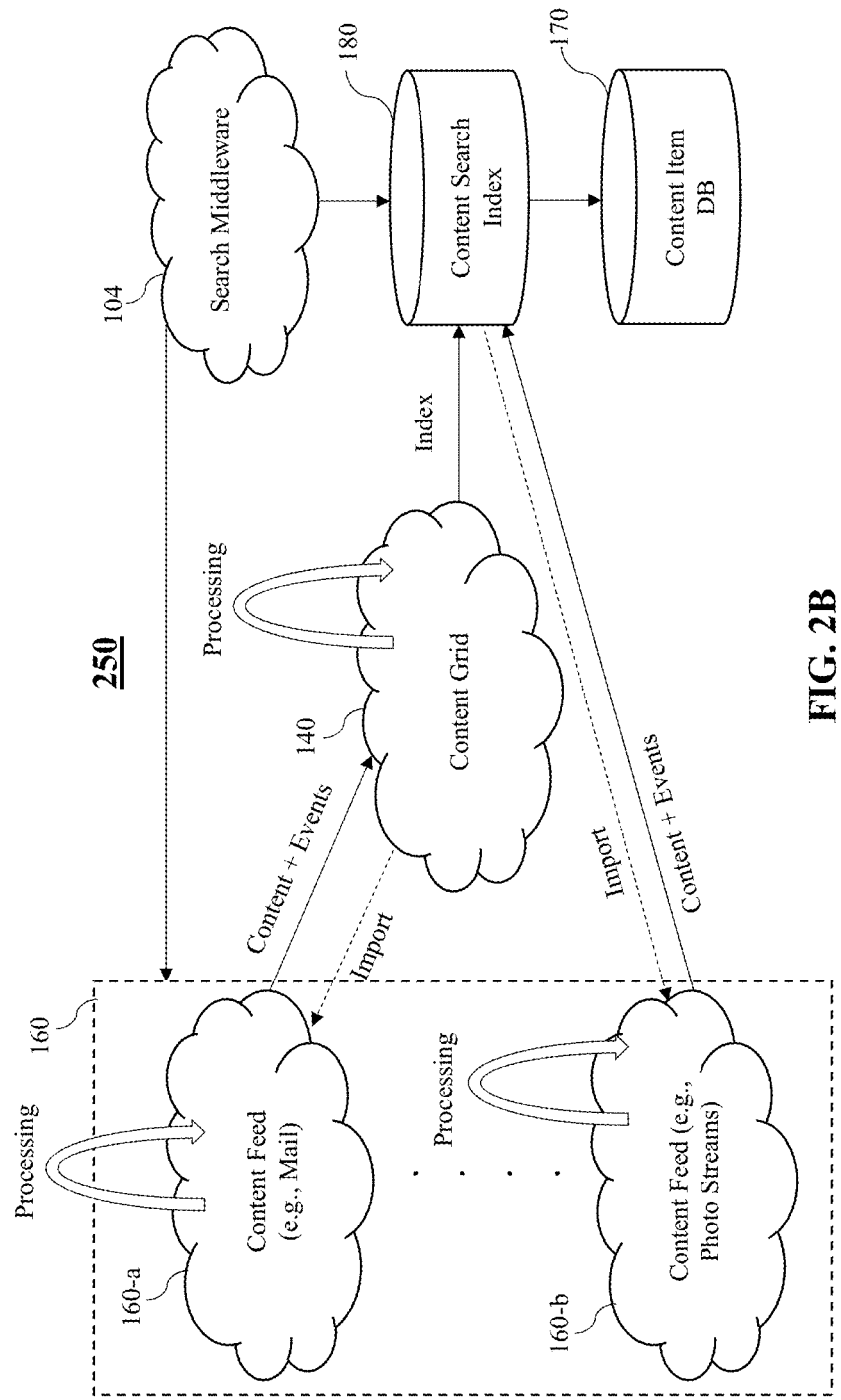

FIGS. 2A and 2B are illustrative diagrams of exemplary data pipelines and search indices, in accordance with various embodiments of the present teaching. In FIG. 2A, a data pipeline 200 is illustrated. Data pipeline 200 may include many similar elements as that of FIGS. 1A and 2A. As seen in FIG. 2A, content feeds 160 may receive content items and events that occur to one or more content items. For example, content feed 160-a, which in the illustrative embodiment corresponds to a mail feed, may receive content items obtained from one or more other users, systems, and/or devices. For instance, in this example, the content items that are received by content feed 160-a may correspond to emails (e.g., an email received from one email address directed to another email address who has an email account with the email service of content feed 160-a). Furthermore, content feed 160-a may receive event data representing actions performed to one or more content items. In this particular scenario, each action that an individual performs to a content item (e.g., an email within their inbox presented via user device 110) may be tracked, and information associated with those actions may be provided to content feed 160-a. For example, when an email is read, event data representing the action of reading an email along with an identifier associated with the email may be received by content feed 160-a. As another example, when an email is deleted, event data representing the action of deleting the email, along with an identified associated with that email, may be received by content feed 160-a as well.

As another example, content feed 160-b, which in the illustrative embodiment corresponds to a photo stream, may receive content items obtained from one or more users, systems, and/or devices. For instance, in this example, the content items that are received by content feed 160-b may correspond to images, videos, text documents, etc., (e.g., a photo uploaded to content feed 160-b from a user device 110). Similar that of content feed 160-a, content feed 160-b may also be configured to received event data representing actions performed to one or more content items. For example, when an individual uploads a new photo to the photo streaming service of content feed 160-b, event data representing the new photo upload, as well as an identifier associated with the new photo that was uploaded, may be received by content feed 160-b.

Thus, content item data representing content items received by each content feed 160, as well as event data representing actions performed to one or more of the content items, may be provided to content grid 140. In some embodiments, the content item data and the event data may be provided to content grid 140 in an asynchronous manner (e.g., not in parallel). However, in some embodiments, the content item data and the event data may be provided to content grid 140 in parallel. Furthermore, in some embodiments, content grid 140 may be configured to provide import information to one or more of content feeds 160. For instance, import information may include information obtained via processing by content grid 140, which may be provided to content feed(s) 160 to refine/analyze/process data stored by content feeds 160. For example, semantic entities derived from content items received by content grid 140 may be provided to content feeds 160 for future content item analysis.

The content item data and/or the event data may be processed (e.g., have one or more processes applied thereto) by content grid 140. As detailed below, the received content item data may be received by content grid 140 and may be stored in a content log organized into temporal epochs. Each epoch may have a particular temporal duration (e.g., one hour), such that each content item received during a corresponding epoch is stored in a different directory of the content log. In some embodiments, the content log may be a log-structured file system. Thus, the content log may include a circular buffer of epochs that may be overwritten after a certain number of available epochs are consumed. In an illustrative embodiment, the content log may be a data structure partitioned into directories, where each directory is associated with an epoch. Thus, the data structure may store data representing the content items received from content feeds 160 during a particular epoch.

In some embodiments, content grid 140 may be further configured to extract one or more semantic entities from one or more content items. The extracted information (e.g., information indicating the semantic entities that were extracted and the corresponding content items associated therewith) may be stored within an extraction log stored by content grid 140. In one example embodiment, the extraction log may also be a log-structured file system organized into epochs. For instance, entities extracted from content items during one epoch may be stored within a data structure partitioned into directories, each directory being associated with an epoch. In some embodiments, the extraction log may be used to generate and/or update a search index.

Content grid 140 may still further be configured to obtain event data, as mentioned above, from content feeds 160. The event data may be stored within an event log by content grid 140, where the event log—similarly to the extraction log and the content log—may be a log-structured file system organized by epochs. In some embodiments, content grid 140 may execute one or more processes to the event data to filter the event data and thereby generate updated event data. The filtering process may, in one embodiment, determine whether actions represented by the event data satisfy pre-determined criteria. For instance, the pre-determined criteria may correspond to determining whether the events are associated with one or more content items in the search index, as well as whether those actions correspond to a type of action that can impact the search index. If so, then content grid 140 may generate and provide an update to the search index and/or an updated search index to content search index 180. If not, then content grid 140 may not access content search index 180, and thus a reduced amount of communications with content search index 180 will occur. This may particularly useful as content search index 180, in an example embodiment, resides on an external platform. Thus, as opposed to traditional techniques where each action represented by the event data requires a call to content search index 180, the techniques described herein minimize the number of calls to content search index 180, saving network resources and computing efficiency.

In some embodiments, an individual may enter a query into their user device 110, which may be received by search middleware 104. Search middleware 104 may analyze the query to extract relevant terms, and may determine relevant content items stored within content item database 170 via a search of the search index or indices stored within content search index 180. In some embodiments, each search index stored within content search index 180 may be associated with a different entity (e.g., a keyword), and thus upon receipt of a query, an appropriate search index or indices may be identified and searched to identify content items that are most relevant to that query. The relevant content items may then be provided to the requesting user device 110, either through search middleware 104 or directly to user device 110, as a response. Furthermore, in some embodiments, search middleware 104 may provide input query information to content feeds 160 for refining of the content analysis processing (e.g., identification of new entities, etc.).

FIG. 2B is illustrative diagram of another example data pipeline 250. Data pipeline 250 may be substantially similar to data pipeline 200 of FIG. 2A, with the exception that in data pipeline 250, the processing of the content item data and/or the event data may be performed across content feeds 160 and content grid 140 and/or solely by content feeds 160.

As an illustrative example, content feed 160-a (e.g., a mail service) may process event data representing actions performed to one or more content items. Content feed 160-a, in this example, may then determine whether each action represented by the event data corresponds to a content item stored within a listing of content items representative of the content items included within the search index. Furthermore, content feed 160-a may determine whether the action corresponds to a particular action type (e.g., email deletion, new email, etc.), which would modify the structure of/results obtained from the search index. Thus, in this example embodiment, if an event satisfies the pre-determined criteria, then an update to the search index and/or and updated search index is sent to content grid 140. At content grid 140, additional processing, such as MapReduce and other scalability related tasks, for example, may be performed. After all processing is completed by the combination of content feed 160-a and content grid 140, the update to the search index and/or the updated search index may be provided to content search index 180.

As another illustrative example, contend feed 160-b (e.g., a photo stream) may be configured to perform all processing on the content feed. Instead of having some processing performed by content grid 140, the processing of the content feed data occurs locally on content feed 160-b. In response, updates to the search index and/or an updated search index may be generated by content feed 160-b, which in turn may be provided to content search index 180. Persons of ordinary skill in the art will recognize that a mixture of content feeds that split processing across themselves and content grid 140, on content grid 140, and solely on content feed 160, may be employed, and the aforementioned are merely exemplary.

Figure 3A:
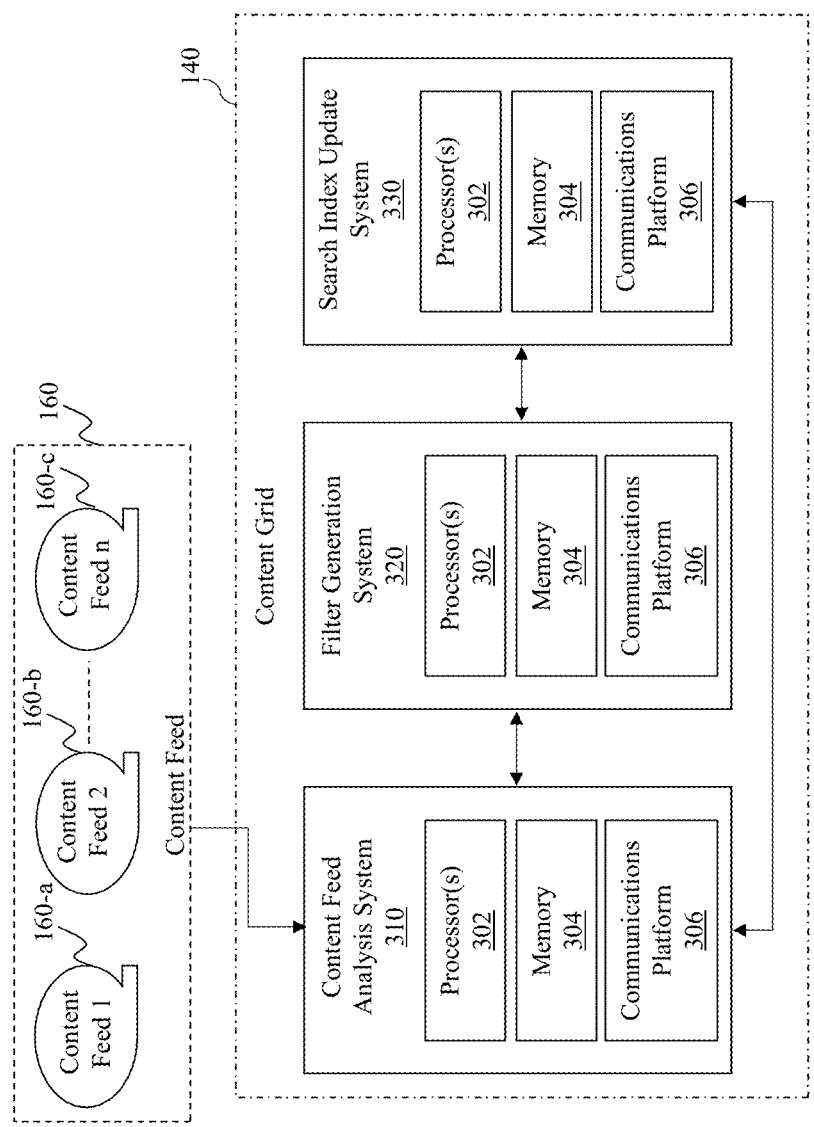
FIG. 3A is an illustrative diagram of an exemplary content grid, in accordance with various embodiments of the present teaching.

FIG. 3A is an illustrative diagram of an exemplary content grid, in accordance with various embodiments of the present teaching. In the illustrative embodiment, content grid 140 may include a content feed analysis system 310, a filter generation system 320, and a search index update system 330. Each of content feed analysis system 310, filter generation system 320, and search index update system 330 may include one or more processors 302, memory 304, and a communications platform 306 capable of connecting to network(s) 120. Although each of content feed analysis system 310, filter generation system 320, and search index update system 330 include instances of processors 302, memory 304, and a communications platform 306, these instance need not be the same, and persons of ordinary skill in the art will recognize that processor(s) 302, memory 304, and communications platform 306 associated with content feed analysis system 310 may differ from processor(s) 302, memory 304, and communications platform 306 of filter generation system 320 and/or search index update system 330. However, it is possible for one or more components to overlap/be shared between different components, and the aforementioned is merely exemplary.

Processor(s) 302 may include any suitable processing circuitry capable of controlling operations and functionality of one or more components/modules of content grid 140. Processor(s) 302 may also facilitate communications between various components within content feed analysis system 310, filter generation system 320, and search index update system 330, as well as, or alternatively, with one or more other systems/components of content grid 140. In some embodiments, each processor may include a central processing unit ("CPU"), a graphic processing unit ("GPU"), one or more microprocessors, a digital signal processor, or any other type of processor, or any combination thereof. In some embodiments, the functionality of the processor may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each processor may include its own local memory, which may store program systems, program data, and/or one or more operating systems. However, the processors may run an operating system ("OS") for one or more components of content grid 140, and/or one or more firmware applications, media applications, and/or applications resident thereon. In some embodiments, the processors may run a local client script for reading and rendering content received from one or more websites or external content sources. For example, the processors may run a local JavaScript client for rendering HTML or XHTML content.

Memory 304 may include one or more types of storage mediums such as any volatile or non-volatile memory, or any removable or non-removable memory implemented in any suitable manner to store data for content grid 140. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the memory may be implemented as computer-readable storage media ("CRSM"), which may be any available physical media accessible by the processors to execute one or more instructions stored within the memory. In some embodiments, one or more applications may be stored within the memory. The processors may be configured to execute one or more instructions associated with those applications, where the one or more instructions are operable to be stored within the memory (either persistently or temporarily).

Communications platform 306 may include any communications platform and/or circuitry allowing or enabling one or more components of content grid 140 (e.g., content feed analysis system 310, filter generation system 320, and search index update system 330) to communicate with one another, and/or with one or more additional devices, servers, databases (e.g., content item database 170, content search index database 180), and/or systems (e.g., search engine 130, content feeds 160, user devices 110). For example, communications platform 306 may facilitate communications between two or more components of content grid 140. In some embodiments, communications between one or more components of content grid 140 may be communicated using user device(s) 110 across network(s) 120 via the communications platform. For example, network(s) 120 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications between various components of content grid 140 and/or to/from content grid 140, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Communications platform 306 may use any communications protocol, such as any of the previously mentioned exemplary communications protocols. In some embodiments, one or more components of content grid 140 may include one or more antennas to facilitate wireless communications with a network using various wireless technologies (e.g., Wi-Fi, Bluetooth, radiofrequency, etc.). In yet another embodiment, one or more components of content grid 140 may include one or more universal serial bus ("USB") ports, one or more Ethernet or broadband ports, and/or any other type of hardwire access port so that the communications platform facilitates communications with one or more communications networks (e.g., network(s) 120).

Content feed analysis system 310, in one embodiment, may be configured to analyze data received from one or more content feeds 160. As described in detail below, content item data and/or event data may be received by content feed analysis system 310 from one or more content feeds 160. In some embodiments, the content item data may represent content items that have been received by content feed 160. For example, if one of content feeds 160 corresponds to an email service, then the received content item data may represent one or more newly received emails. In some embodiments, the event data may represent actions performed to one or more content items. Continuing the example above where one of the content feeds 160 corresponds to an email service, the received event data may represent actions performed/related to one or more emails within an individual's email account (e.g., inbox). An exemplary action performed to a content item may include an email deletion, a new email, moving an email to a folder, and the like.

Content item feed analysis system 310 may segment the received content item data and/or event data into epochs. An epoch may correspond to an amount of time during which any content item data and/or event data received during that amount of time is grouped together in a same entry. For instance, content item data may be stored within a content log. The content log may be a log-structured file system organized into epochs such that content item data received during a first epoch (e.g., between a first time and a second time) is stored in a first directory of the content log, content item data received during a second epoch (e.g., between the second time and a third time) is stored in a second director of the content log, and so on. Similarly, event data may be stored within an event log, which may also be a log-structured file system organized into epochs. While the epochs may be substantially similar for both the content log and the event log (and similarly an extraction log described below), the data stored within an epoch for each log may differ. For example, an email may be received during a first epoch may have content item data stored within the content log for the first epoch and may have an action (e.g., new email receipt) stored within the event log for the first epoch. However, if during an n-th epoch, the email is deleted, the deletion action associated with the email may be logged within the n-th epoch of the event log only.

Content feed analysis system 310 may further be configured to analyze the content items received and stored within the content log during each epoch to extract information from one or more of the content items. For instance, an extraction log, which may also be a log-structured file system organized into corresponding epochs, may store information associated with extracted entities from content items stored within the content log. As an illustrative example, an email may include a digital receipt. Thus, content feed analysis system 310 may analyze the email, determine that it includes the digital receipt, and extract information associated with the digital receipt from the content item along with an identifier associated with the content item and temporal information for when the email was received. Therefore, various semantic entities may be extracted from certain content items within the content log, and the extracted information may be stored in the extraction log.

In some embodiments, the extraction log may be employed to generate a search index and/or generate an update to a search index. For example, the search index may be generated based on the extracted entities from the content items. Using the example above, for an entity "receipts," each content item (e.g., email) that is received that is related to the entity "receipts" may be identified and used to populate a search index for this entity. Therefore, the search index may include a posting list of content item identifiers, each being associated with a content item that is related to that search index's corresponding entity. In some embodiments, the search index's posting list may be an inverted list where a content item identifier associated with a content item determined to be most relevant to that search index's entity is ranked first, while a content item identifier associated with a content item determined to be least relevant to the search index's entity is ranked last. Furthermore, in some embodiments, each search index posting list may include, at most, a single instance of a content item identifier (i.e., a content item will only be represented within a posting list one time at most).

Filter generation system 320 may, in some embodiment, be configured to generate a filter for use by content grid 140 to filter out events that do not impact a search index. By doing so, a minimal amount of communication between content grid 140 and content search index 180 occurs, saving valuable network resources, reducing latency, and improving system efficiency. Filter generation system 320 may, in some embodiments, obtain extraction information from the extraction log generated by content feed analysis system 310, which may be used to generate a list of content items representative of the content items included within the search index. Upon receipt of the event data, a check may be made by filter generation system 320 to the list of content items. The check may determine whether a content item having an action represented by the event data is also included within the list of content items. If so, and if that action satisfies one or more pre-determined criteria, such as is of a particular type of action (e.g., deletion), then filter generation system 320 may instruct search index update system 330 to generate an update to the search index and/or generate an updated search index.

In some embodiments, filter generation system 320 may generate a list of content items by employing a Bloom Filter. A Bloom Filter may correspond to a type of filter whereby a check of the Bloom Filter will yield zero false negatives and a minimum amount of false positives. Persons of ordinary skill in the art will recognize that although a Bloom Filter is described above, any suitable filter may be employed, and the aforementioned is merely illustrative.

In some embodiments, filter generation system 320 may generate multiple lists of content items, each list being associated with a different entity type. For instance, one list of content items may be associated with the entity type "coupons," while another list of content items may be associated with the entity type "flight itineraries." Each list of content items may correspond to a posting list included within content search index database 180, as each list of content items may be generated based on a same extraction log. The list of content items may then be selected based on the corresponding content item whose action is under analysis from the event data.

In order to determine which list of content items to analyze, content items may be hashed into different hash buckets, each associated with a list of content items. For example, upon receipt of a content item within content item data, that content item's identifier (e.g., a unique identifier for a particular content item) may be hashed into a data bucket. For example, a first content item, having a first content item identifier, may be hashed into a first data bucket, while a second content item, having a second content item identifier, may be hashed into a second data bucket. The first data bucket may be associated with a first list of content items, while the second data bucket may be associated with a second list of content items. When the event data from the event log is analyzed, a content item identifier associated a content item having an action performed thereto may be determined. Based on that content item identifier, the data bucket that the content item identifier had previously been hashed to is identified, and the list of content items associated with that data bucket may be determined. By generating multiple lists of content items, and hashing content item identifiers to different data buckets associated with respective lists of content items, the techniques described herein allow for scalability, thereby eliminating bottleneck issues that could occur with a list of content items including too many entries.

Search index update system 330 may be configured to generate an update for the search index and/or generate an updated search index. For instance, in response to filter generation system 320 determining that received event data represents an action of a particular type, and that the action is associated with a content item included within a list of content items representative of content items from the search index, then search index update system 330 may facilitate one or more processes to update the search index. This may include generating a new search index reflective of the action performed to the content item (e.g., a deletion of the content item from the search index), or an instruction to update the search index (e.g., an instruction to delete the content item from the search index). By updating the search index for only actions that would otherwise impact the search index, a minimum number of calls to the search index—typically residing on a remote platform from content grid 140—is made. Furthermore, by employing the list of content items (e.g., via a Bloom Filter), only those actions associated with content items that have a high probability of existing within the search index are used for updates to the search index.

FIG. 3B is an illustrative flowchart of an exemplary process for determining whether an update to a search index is to be generated, in accordance with various embodiments of the present teaching. In the non-limiting embodiment, process 350 may begin at step 352. At step 352, event data may be received from one or more content feeds. For instance, content feed analysis system 310 may obtain event data from content feed(s) 160. The event data, as mentioned previously, may represent actions performed to one or more content items. For example, if the content feed corresponds to an email service, then an action performed to a content item may include, but is not limited to, reading an email, marking an email as being unread, deleting an email, receiving a new email, marking an email as urgent, moving an email to a new folder, and the like.

At step 354, relevant content items may be determined based on the actions associated with those content items identified from the event data. Although these content items are indicated as being "relevant," this step may be thought of as a first filtering portion, and thus these may also be referred to as initially relevant content items and/or preliminary relevant content items. The event data may represent actions performed to one or more content items during an epoch. Some actions, as mentioned previously, may have little to no impact on a search index. For example, reading an email may not impact that email's status within an email search index. As another example, deleting an email will impact the email search index, as deleted emails should, after some time, stop appearing as a search result to an email query. Thus, the relevant content items determined at step 354 may correspond to emails whose actions satisfy pre-determined criteria. The pre-determined criteria may correspond, in some embodiments, to actions whose type is one that may impact a content item's representation and status within a search index.

At step 356, a list of content items represented within a search index may be retrieved. The list of content items may, in one embodiment, correspond to a Bloom Filter's list. In one embodiment, the list of content items may be generated based on the content items that had information extracted therefrom and stored within an extraction log. For instance, the extraction log may form a basis for generation of the search index and the list of content items. In some embodiments, if there are multiple lists of content items, then the list of content items retrieved and/or identified at step 356 may be determined based on a content item identifier of the content item whose action is indicated as being relevant at step 354. For instance, if a content item identifier has a delete action associated with it, as determined from the event data, then the list of content items that may include that content item identifier may be determined. This may occur by determining a data bucket that the content item identifier had been hashed into during the extraction process, and then determining the list of content items associated with that data bucket.

At step 358, a determination may be made as to whether the list includes one or more of the content items determined to be relevant. For example, if the event data represents a first action performed to a first content item, where the first action is of a particular type (e.g., a deletion action), then a determination may be made as to whether a list of content items includes that content item (or that content item identifier). If, at step 358, it is determined that the list does include one or more of the content items, then process 350 may proceed to step 360. At step 360, an update to the search index and/or an updated search index may be generated. The update to the search index and/or updated search index may reflect the action(s) having been performed to the content item(s), thereby modifying the search index. If, however, at step 358, it is determined that the list does not include the one or more content items, then process 350 may proceed to step 362. At step 362, the event data may continue to be monitored for detecting actions whose corresponding content items may impact the search index.

Figure 4A:
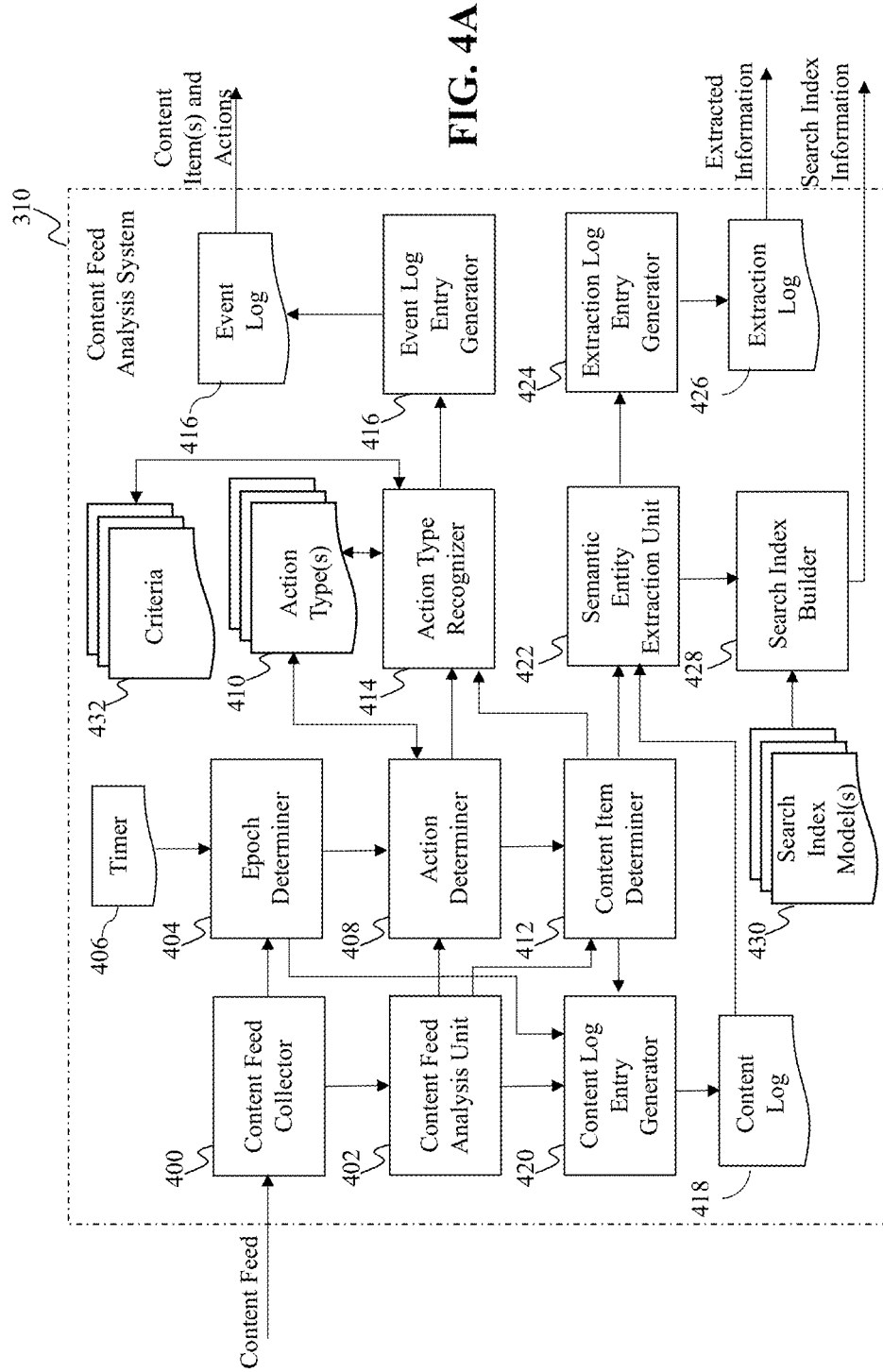
FIG. 4A is an illustrative diagram of an exemplary content feed analysis system, in accordance with various embodiments of the present teaching.

FIG. 4A is an illustrative diagram of an exemplary content feed analysis system, in accordance with various embodiments of the present teaching. Content feed analysis system 310, in the illustrative embodiment, may include a content feed collector 400, a content feed analysis unit 402, an epoch determiner 404, an action determiner 408, a content item determiner 412, an action type recognizer 414, an event log entry generator 416, a content log entry generator 420, a semantic entity extraction unit 422, an extraction log entry generator 424, and a search index builder 428. In some embodiments, each of content feed collector 400, content feed analysis unit 402, epoch determiner 404, action determiner 408, content item determiner 412, action type recognizer 414, event log entry generator 416, content log entry generator 420, semantic entity extraction unit 422, extraction log entry generator 424, and search index builder 428 may each be implemented via one or more computer program instructions stored within memory 304 of content feed analysis system 310. For instance, processor(s) 302 of content feed analysis system 310 may be configured to execute one or more computer program instructions stored within memory 304 of content feed analysis system 310 to cause the functionalities associated with one or more of content feed collector 400, content feed analysis unit 402, epoch determiner 404, action determiner 408, content item determiner 412, action type recognizer 414, event log entry generator 416, content log entry generator 420, semantic entity extraction unit 422, extraction log entry generator 424, and search index builder 428 to be performed.

Content feed collector 400, in one embodiment, may be configured to receive a feed of content from content feed(s) 160. The content feed may include content item data representing content items, as well as event data representing actions performed to one or more content items. Content feed collector 400, for instance, may receive content item data representing content items. In this particular scenario, the content items may correspond to new content received by a corresponding content feed 160. For example, if the content feed is an email service, the content item data may represent newly received emails and/or newly sent emails by a user of the email service. In this particular scenario, the content item data may further include information associated with a user account. For example, the content item data may include an email account identifier indicating an email account that a new email, represented by the content item data, was received by. Additionally, content feed collector 400 may receive event data representing actions performed to one or more content items. In this particular scenario, the actions may represent any action performed to a content item associated with a particular content feed 160. For example, if the content feed is an email service, then the actions may correspond to reading of an email, deletion of an email, movement of an email to a folder, etc. As another example, the content feed is a photo streaming service, then the actions may correspond to uploading a new photo/video, deleting a photo/video, editing a photo/video, sharing a photo/video, etc. The collected content item data, received from the various content feeds 160, may then be provided to content feed analysis unit 402, as well as to epoch determiner 404.

Content feed analysis unit 402 may be configured, in one embodiment, to analyze the content item data and/or event data received from content feed collector 400. Content feed analysis unit 402 may determine whether the particular feed of content that is received corresponds to content item data or event data. Based on the analysis, content feed analysis unit 402 may be configured to provide the received content item data, representing the one or more received content items (e.g., new emails received, new sent emails, etc.) to content log entry generator 420. Furthermore, content feed analysis unit 402 may be configured to provide the event data representing actions performed to the one or more content items to action determiner 408.

Persons of ordinary skill in the art will recognize that the content items represented by the content item data and the content items having actions performed thereto, as represented by the event data, need not be the same content items. As mentioned above, the event data represents actions performed to content items. Thus, these content items likely already exist within the corresponding search index. Put another way, these content items may already have a representation known to the corresponding content feed, and may be stored within content item database 170. For example, if the content feed corresponds to an email service, then the content items having actions performed thereto may correspond to emails within an individual's email account (e.g., inbox, sent box, folders, drafts, etc.). The content item data may, however, represent content items that are received by the corresponding content feed. Using the email service example, this may correspond to newly received emails, newly sent emails, and the like. In this particular scenario, additional analysis of those content items (e.g., semantic entity recognition, data bucket hashing, etc.) may still need to occur.

Epoch determiner 404, in one embodiment, may be configured to determine an epoch during which a corresponding action was performed and/or content item data was received by content feed(s) 160. Epoch determiner 404 may employ a timer 406 to determine a current time, corresponding to the time of receipt of data, and compare that time to a timestamp of when an action was performed and/or a content it was received. Epoch determiner 404 may generate an epoch for a content log 418, an extraction log 416, and an event log 416. Each epoch may be of a predetermined temporal duration, having a start time and an end time. The start time for an epoch may be set using timer 406, and so may the end time. Each epoch may be of a substantially same amount of time. For example, each epoch may be approximately one hour, however other amounts of time may similarly be employed. Epoch determiner 404 may be configured to provide the given epoch information (e.g., indicating an epoch during which content item data and/or event data was received) to action determiner 408 as well as content log entry generator 420.

Content item determiner 412, in one embodiment, may be configured to determine a content item identifier associated with a content item. The content item, in this scenario, may correspond to a content item that is represented by content item data received by content feed collector 400, however alternatively, the content item may correspond to a content item that an action has been performed to, and this is represented by the event data received by content feed collector 400. Each content item may be referenced by a content item identifier, which may be a string of characters unique to a particular content item. The content item identifiers may point to their corresponding content items stored within content item database 170. Upon receipt of content item data, content feed analysis unit 402 may provide the content item data to content item determiner 412 to extract or assign an identifier to each content item represented by the content item data. Furthermore, upon receipt of event data, content feed analysis unit 412 may provide the event data to action determiner 408, which upon determining a type of action associated with each action represented by the event data, may provide the event data to content item determiner 412. Here, content item determiner 412 may be configured to determine a content item identifier associated with a content item that an action has been performed to. Content item determiner 412 may then provide the content item identifier to content log entry generator 420. Furthermore, content item determiner 412 may also be configured to provide the identifier content item identifier(s) to action type recognizer 414, as well as semantic entity extraction unit 422.

Content log entry generator 420 may be configured to receive content item data from content feed analysis unit 402, epoch information from epoch determiner 404, and content item identifier data from content item determiner 412. Content log entry generator 420 may then be configured to generate an entry and/or an update to an entry within content log 418. Content log 418 may be a data structure organized as a log-structured data file. Therefore, content log 418 may be segmented into epochs, based on the received epoch information. Content item data received during a particular epoch, based on the epoch information and temporal metadata associated with each content item from the content item data, may be stored within a directory of the data structure for the particular epoch. For example, content item data received at a time X may be stored within an entry of the data structure of content log 418 corresponding to an epoch having a start time of X−A and an end time of X+A. Furthermore, the content items corresponding content item identifiers may also be stored within content log 418 with the associated content item data.

In some embodiments, action determiner 408 may be configured to receive event data from content feed analysis unit 402. Action determiner 408 may employ action types 410 to determine a type of action associated with each action performed to a content item as represented by the event data. Furthermore, action determiner 408 may receive epoch information indicating an epoch during which the corresponding event data was received, and thus when the action occurred. Action type(s) 410 may include, but are not limited to, deletion of content items, receipt of new content items, edits to content items, viewing/reading/marking as unread/applying a metadata tag to content items, moving a content item from one directory (e.g., a mail folder or photo album to another), and the like. Action determiner 408 may analyze the event data and may assign an action type to each action represented by the event data. The assigned action type, as well as epoch information associated with each action, may then be provided to action type recognizer 414. Furthermore, as mentioned above, content item determiner 412 may determine a content item associated with each action, and may provide that content item's corresponding identifier to action type recognizer 414 (as well as to semantic entity extraction unit 422).

Action type recognizer 414 may be configured, in one embodiment, to determine whether a type of action associated with a given action represented by the event data is satisfied pre-determined criteria 432. Criteria 432 may, in some embodiments, specify whether a corresponding action type 410 for an action is one that may impact a search index. For instance, a deletion of a content item may impact a search index because a deleted content item should no longer appear as a possible search result when a query is performed. Thus, action type recognizer 414 may identify which actions are associated with criteria 432, and may provide this information to event log entry generator 416. However, persons of ordinary skill in the art will recognize that in some embodiments, the analysis of the type of action and whether that type of action satisfies some criteria for the later filtering process, as described below, may be performed by filter generation system 320 and/or search index update system 330, and the aforementioned is merely exemplary.

Event log entry generator 416 may, in one embodiment, be substantially similar to content log entry generator 420, with the exception that event log entry generator 416 may generate an entry in event log 416. Event log 416 may correspond to a data structure that is log-structured, which may also be organized into epochs. In one embodiment, the epochs of event log 416 may be substantially similar to the epochs of content log 418. In this sense, an action that is performed to a content item during one epoch may relate to a content item that was received during a previous epoch. In some embodiments, each event log entry may include event data that occurred during a corresponding epoch. Furthermore, the entry in event log 416 may include the event data that occurred during a particular epoch, content item identifiers associated with the content items that the event data's actions correspond to, and an action type associated with each action. Thus, the content item(s), represented by their corresponding content item identifiers, and the corresponding actions associated with those content items may be output from event log 416 and may be provided to filter generation system 320.

Semantic entity extraction unit 422, in one embodiment, may be configured to obtain content item data representing content items from content log 418, and may also receive content item identifiers associated with those content items from content item determiner 412. Semantic entity extraction unit 422 may perform semantic entity analysis to the content items included within each epoch to determine whether any content items include information associated with a particular entity. For example, if a content item corresponds to an email including a receipt, then semantic entity extraction unit 422 may recognize that that email includes a receipt, and may provide extraction information to search index builder 428 and extraction log entry generator 424. Here, the extraction information may indicate an entity identified within a content item, an epoch during which that content item was received, and a content item identifier associated with that content item. This information may be employed to generate a search index for content search index database 180. Semantic entity extraction unit 422 may analyze the content item data as it is received and stored within content log 418. Not all of the content items may produce extractable information. For instance, for a particular email account, only a small percentage of emails received will include a relevant semantic entity. The portion of content items that include information that may be extracted, as that information relates to one or more semantic entities, may be identified and provided to extraction log entry generator 424, as well as to search index builder 428.

Search index builder 428 may generate a search index using one or more search index models 430. The extracted entity information, and the content items and their identifiers that yielded the extracted entity information, may be received from semantic entity extraction unit 422 and used with model(s) 430 to generate a search index or indices. A search index, as described herein, may include one or more lists of content item identifiers. These lists may sometimes be referred to as "posting lists," which correspond to inverted lists of content item identifiers ranked based on a relevancy score with respect to a particular query and/or query term. For instance, for a query term "coupon," a posting list may include one or more content item identifiers ranked in an order from most relevant to the query term "coupon" to least relevant to the query term "coupon." Any suitable relevancy/relational formulation may be employed to determine the relevancy of a content item to a query term and/or phrase. Further, each posting list, as mentioned above, includes content item identifiers as opposed to content items to reduce the digital footprint of the posting lists. The content item identifiers may point to a corresponding content item within content item database 170.

The search index built by search index builder 428 may be generated and/or updated based on the extracted entity information from semantic entity extraction unit 422. For instance, if a posting list for the entity "receipt" already exists within content search index database 180 for a particular user account, then search index builder 428 may generate search index information including an update to that posting list in response to extracting information related to the entity "receipt" from a newly received content item. Alternatively, a search index may be built from scratch by search index builder 428 such that the search index information includes posting lists for one or more extracted entities. The search index information may then by output by search index builder 428 and provided to search index update system 330, in one embodiment.

Extraction log entry generator 424 may be configured, in one embodiment, to generate an entry within extraction log 426 representative of any information extracted during a particular epoch. For instance, extraction log entry generator 424 may receive the extracted entity information from semantic entity extraction unit 422, along with epoch information and content item information associated with the content item that the entity information was extracted from. Extraction log entry generator 424 may generate an entry within extraction log 426 for the extracted information. Extraction log 426, similarly to event log 416 and content log 418, may be segmented into epochs (which may be substantially similar). Furthermore, similarly to event log 416 and content log 418, extraction log 426 may be a log-structured file system corresponding to a data structure segmented into epochs. Therefore, entity information extracted during a first epoch from a first content item within content log 418 may be stored within an entry of extraction log 426 associated with the first epoch. The entry may include information associated with the extracted entity, the epoch (e.g., a time that the entity was extracted and/or the content item with which the entity was extracted from was received), and the content item identifier associated with the content item that the entity was extracted from. The extracted information may, in some embodiment, be output to filter generation system 320 for generation of a listing of content items representative of the search index. In some embodiments, the search index information and the extracted information may be substantially similar. As detailed below, this may be so that the filter's list of content items indicates those content items that also appear within the search index (e.g., within a posting list of the search index).

Figure 4B:
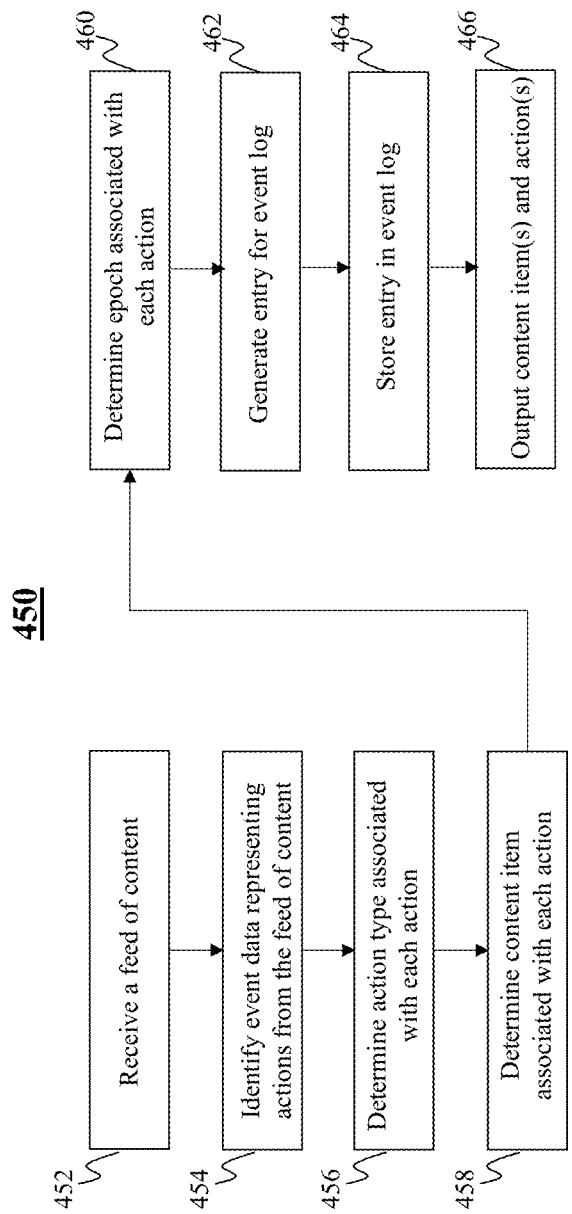
FIG. 4B is an illustrative flowchart of an exemplary process for identifying and storing events in an event log, in accordance with various embodiments of the present teaching.

FIG. 4B is an illustrative flowchart of an exemplary process for identifying and storing events in an event log, in accordance with various embodiments of the present teaching. In the non-limiting embodiment, process 450 may begin at step 452. At step 452, a feed of content may be received. The feed of content may correspond to a live stream of content received by one or more content feeds 160. For instance, a feed of content may represent content item data received by an email service for a particular user account. For example, received emails, sent emails, actions associated with emails already present within one's inbox, may all correspond to the feed of content received. In some embodiments, the feed of content may be received by content feed collector 400.

At step 454, event data representing actions performed to one or more content items may be identified from the feed of content. For instance, content feed analysis unit 402 may identify whether the feed of content includes event data and/or content item data. If the feed of content includes event data, then that event data may be provided to action determiner 408. At step 456, an action type associated with each action represented by the event data may be determined. The action type, which may be described herein interchangeably as a type of action, may be determined by action type recognizer 414 based on action types 410. For example, if an action that may be performed to an email, or emails, may include, but is not limited to, deleting emails, moving emails to folders, deleting emails, forwarding emails, and the like.

At step 458, a content item associated with each action may be determined. As described above, each action may be performed to a particular content item. Therefore, the event data may also include a corresponding content item identifier representing the content item that the action was performed to. The content item identifier may be determined by content item determiner 412, in one embodiment. At step 460, an epoch associated with each action may be determined. The epoch may, in some embodiments, correspond to a particular temporal duration during which the action was performed to the content item. The event data may further include temporal metadata (e.g., a timestamp) for when the action occurred and/or when the event data representing that action was received. Based on the temporal metadata, for instance, an epoch associated with each action may be determined. In one embodiment, epoch determiner 404 may be employed, along with timer 406, to determine an epoch associated with a particular action.

At step 462, an entry for an event log may be generated. In some embodiments, event log entry generator 416 may generate an entry for event log 416. The entry may include the event data associated with a particular action, the action type, temporal metadata, and a content item identifier associated with the content item that the action was performed to. At step 464, the entry may be stored in the event log. The entry may be generated for the data structure represented by event log 416. Thus, when stored to event log 416, the entry may be added to the data structure including the aforementioned information. At step 466, the content item(s) and action(s) associated therewith may be output from content feed analysis system 310. For instance, the content item identifier(s) associated with the content item(s), and the types of actions performed to those content item(s), may be output from event log 416 to filter generation system 320.

Figure 4C:
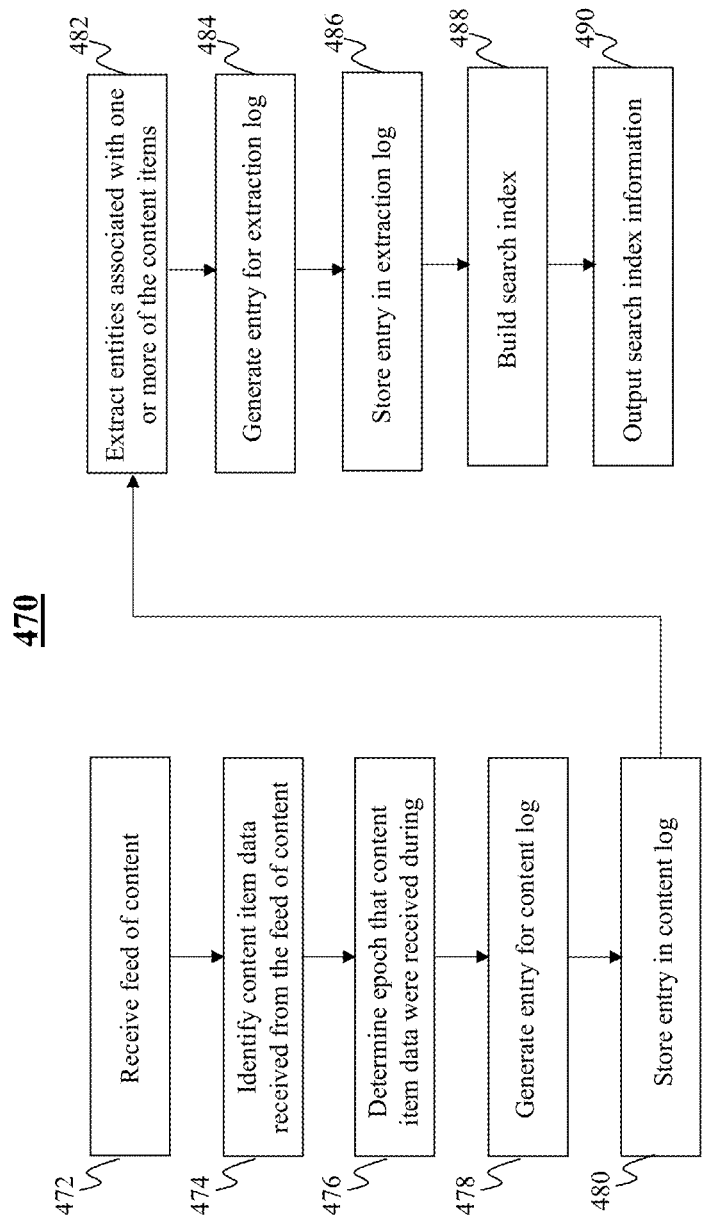
FIG. 4C is another illustrative flowchart of an exemplary process for building a search index, in accordance with various embodiments of the present teaching.

FIG. 4C is another illustrative flowchart of an exemplary process for building a search index, in accordance with various embodiments of the present teaching. In the non-limiting embodiment, process 470 may begin at step 472. At step 472, a feed of content may be received. Step 472 of process 470 may be substantially similar to step 452 of process 450, and the previous description may apply. At step 474, content item data received from the feed of content may be identified. For instance, and as described above, content feed analysis unit 402 may identify whether the feed of content includes content item data and/or event data. In this particular scenario, content feed analysis unit 402 may determine that the feed of content includes content item data representing one or more content items. These content items may correspond to content items received by a particular content feed 160, content items output from a particular content feed 160, and the like.

At step 476, an epoch during which the content item data was received during may be determined. For instance, epoch determiner 404 may determine, based on temporal metadata (e.g., a timestamp) associated with the content item data, when each content item was received by and/or sent from a content feed 160. Based on the temporal metadata and timer 406, an epoch (e.g., a temporal duration) may be identified. At step 478, an entry for a content log may be generated. For instance, content log entry generator 420 may generate an entry for content log 418. The entry may, in some embodiments, include the content item data, content item identifier(s) of the content item(s) represented by the content item data, and the temporal metadata to indicate the epoch that the entry corresponds to. At step 480, the entry may be stored within the content log. For example, the content item data representing one or more content items may be received at a first time, which falls within a first epoch. Therefore, the entry may be written to a data structure representing content log 418, where the entry is associated with the first epoch. Any other content items received during the first epoch would also be written to an entry within the first epoch.

At step 482, one or more entities associated with the one or more content items may be extracted. For instance, semantic entity extraction unit 422 may perform a semantic entity analysis to each content item represented by the content item data to determine whether any of the content items include an extractable entity. As an illustrative example, if a received email (e.g., a content item) includes a digital receipt, then semantic entity extraction unit 422 may extract the digital receipt, and may provide the extracted digital receipt along with a document identifier for that email to search index builder 428 and extraction log entry generator 424. At step 484, an entry for an extraction log may be generated. Step 484 may be substantially similar to step 478, with the exception that step 484 corresponds to an entry for an extraction log. Furthermore, the number of entries of the extraction log may, in some embodiments, correspond to only a small portion of the total number of content items included within the content log. This may be due to the fact that only a portion of the received content items may include extractable information. However, persons of ordinary skill in the art will recognize that this is merely exemplary. At step 486, the entry may be stored to the extraction log. For example, an entry to extraction log 426 for the extracted digital receipt may be stored to a data structure representing extraction log 426, where the entry is associated with an epoch during which the corresponding content item that the digital receipt was extracted from was received by a content feed 160.

At step 488, a search index may be built. For instance, a new search index and/or an update to a search index may be built by search index builder 428 using search index model(s) 430. At step 490, search index information indicating the update to the search index and/or the new search index may be output. For instance, the search index information may be provided to search index update system 330 for perform an update to the search index (e.g., one or more positing lists) stored within content search index database 180.

Figure 5A:
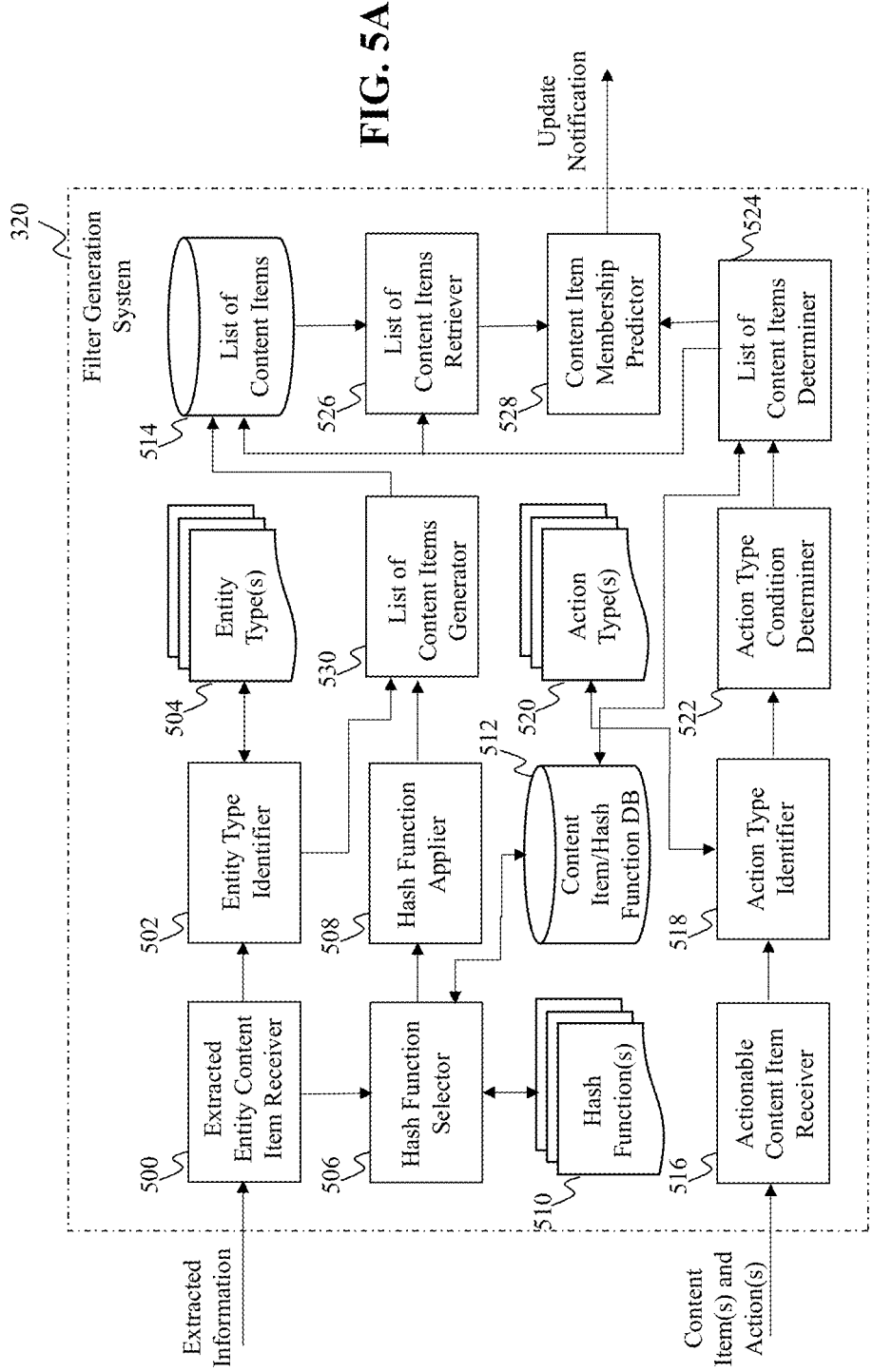
FIG. 5A is an illustrative diagram of an exemplary filter generation system, in accordance with various embodiments of the present teaching.

FIG. 5A is an illustrative diagram of an exemplary filter generation system, in accordance with various embodiments of the present teaching. Filter generation system 320 may include an extracted entity content item receiver 500, an entity type identifier 502, a hash function selector 506, a hash function applier 508, a list of content items generator 530, an actionable content item receiver 516, an action type identifier 518, an action type condition determiner 522, a list of content items determiner 524, a list of content items retriever 526, and a content item membership predictor 528. Filter generation system may also include a content item/hash function database 512, and a list of content items data store 514. In some embodiments, each of extracted entity content item receiver 500, entity type identifier 502, hash function selector 506, hash function applier 508, list of content items generator 530, actionable content item receiver 516, action type identifier 518, action type condition determiner 522, list of content items determiner 524, list of content items retriever 526, and content item membership predictor 528 may each be implemented via one or more computer program instructions stored within memory 304 of filter generation system 320. For instance, processor(s) 302 of filter generation system 320 may be configured to execute one or more computer program instructions stored within memory 304 of filter generation system 320 to cause the functionalities associated with one or more of extracted entity content item receiver 500, entity type identifier 502, hash function selector 506, hash function applier 508, list of content items generator 530, actionable content item receiver 516, action type identifier 518, action type condition determiner 522, list of content items determiner 524, list of content items retriever 526, and content item membership predictor 528 to be performed.

Extracted entity content item receiver 500 may, in one embodiment, be configured to receive extracted information from extraction log 426. The extracted information may include information associated with an entity/entities extracted from a particular content item, the content item identifier that the entity/entities were extracted from, as well as temporal metadata indicating a time that the content item was received (e.g., the feed of content was received by content source 160). Extracted entity content item receiver 500 may provide the extracted information to entity type identifier 502 as well as hash function selector 506.

Entity type identifier 502 may be configured to identify an entity type associated with the extracted information. In some embodiments, entity type identifier 502 may employ entity types 504 to recognize which entity the extracted information corresponds to. For instance, the various entity types may include digital receipts, coupons, contact names, subject matter specific topics, keywords, and the like. In some embodiments, entity type identifier 502 may employ machine-learning techniques to identify new entity types 504 based on actions performed by different users. For example, a new email folder may be learned to be a specific entity such that, when a new email is received having a relationship to other emails stored within that email folder, the information is extracted to indicate that the new email is related to the folder. The identified entity type for each content item that had information extracted therefrom may then be provided to list of content item generator 530, along with the content item identifier associated with that content item. In some embodiments, entity type identifier 502 may implement map reduction (e.g., MapReduce) processing to reduce the about of entities to be further analyzed, as known to those of ordinary skill in the art.

Hash function selector 506 may be configured to select a hash function 510 to use to hash a content item identifier to a particular data bucket. Hash function(s) 510 may correspond, in one embodiment, to a randomizer function that randomly places a particular identifier into one data bucket. For example, if there are two data buckets, a hash function may, based on an input, assign an item to one of those data buckets. The hash function used for a particular content item may be maintained so that, when that content item is to be located, the identifier may be input to the same hash function so as to obtain the same data bucket result. In some embodiments, hash function selector 506 may store a listing of each content item and the corresponding hash function selected for hashing that content item's identifier. This listing may be stored within content item/hash function database 512, which, as described below, may be called upon at latter times for determining which list of content items a particular content item's identifier is located within.

Hash function applier 508 may be configured to apply the selected hash function obtained from hash function selector 506 to a content item identifier that had information extracted therefrom. Hash function applier 508 may apply the selected hash function to determine a data bucket for placement of the content item identifier. Each content item identifier may be assigned to a different data bucket, which will be associated with a different list of content items. This may allow for the system to be scalable as to handle large amounts of data. For instance, if only a single list of content items is used, each time filter generation system 320 needs to determine whether a content item that an action was performed to is included within the list, the entire list may need to be analyzed. By hashing the content item identifiers into a plurality of lists of content items, the lists may be smaller, decreasing the amount of time needed to scan a particular list. Therefore, when event data is received, the content item identifier associated with the content item that an action was performed to may be used to identify a data bucket, and thus the list of content items associated with that data bucket.

List of content items generator 530 may be configured, in one embodiment, to generate one or more lists of content items representing those content items included within the search index. Each generated list may be stored within list of content items data store 514, and may be accessed and analyzed for to determine whether an update to a search index is to occur. List of content items generator 530 may receive identified entities from entity type identifier 502, indicating the different types of entities extracted from one or more content items received by content feed(s) 160. Additionally, list of content items generator 530 may receive data bucket information indicating content item identifiers and the corresponding data buckets that those content item identifiers have been hashed to. Based on the data bucket information, and the entity information, list of content items generator 530 may generate one or more lists of content items. In some embodiments, the lists of content items may correspond to a Bloom Filter's list. The Bloom Filter's list may represent, with a high probability of being correct (e.g., zero false negatives and minimal false positives), content item identifiers that are included within a search index.

As mentioned above, multiple lists of content items may be generated. For instance, for each entity type 504, a list of content items may be generated. For example, there may be a list of content items generated for an entity type "receipts," while another list of content items may be generated for an entity type "coupons," and so on. List of content items data store 514 may store each list of content items with an identifier of the entity that that list is associated with. Furthermore, each entity type's list of content items may be partitioned into one or more lists by hashing the content items into one or more data buckets. This may be done to improve scalability such that each lists includes a smaller number of entries. For example, for the entity type "receipt," a first list of content items and a second list of content items may be generated, each storing content item identifiers representing content items having information extracted therefrom related to the entity "receipt." When extracted entity content item receiver 500 receives the extracted information, the content item identifiers may then be provided to hash function selector 506 and hash function applier 508 to hash each content item identifier into one of a first data bucket or a second data bucket. In this particular example, the first data bucket may be associated with the first list of content items, while the second data bucket may be associated with the second data bucket.

The generation of different lists of content items by hashing may improve scalability by fixing the size of each list of content items. When a list of content items is full, a new list may be generated, and content item identifiers that would otherwise go to the original list of content items may be hashed into one of the original list and the newly generated list (where in this example, some of the content item identifiers from the original list may be moved to the newly generated list for balancing purposes).

As mentioned previously, each list of content items may represent content items included within the search index. For instance, a content item that entity information was extracted from may have its corresponding identifier included within a posting list associated with that entity within the search index stored by content search index database 180. In parallel, the content item's identifier may also be stored within a list of content items within list of content items data store 514. This may allow filter generation system 320 to determine, with high confidence, whether an action performed to a content item may affect the search index, instead of applying each action to the search index.

Actionable content item receiver 516 may, in one embodiment, be configured to receive content item(s) and action(s) from content feed analysis system 310. Actionable content item receiver 516 may, for instance, receive event data representing actions performed to one or more content items. Furthermore, actionable content item receiver 516 may receive content item identifiers associated with each content item that an action was performed to. For example, actionable content item receiver 516 may receive event data representing actions performed to emails by a user. Continuing this example, actionable content item receiver 516 may receive document identifiers associated with each of the emails that the user performed an action to.

The content item identifiers and the actions performed to the content items represented by those content item identifiers may then be provided to action type identifier 518. Action type identifier 518 may access action types 520 to recognize a type of action associated with each content item identifier. In some embodiments, action types 520 may be substantially similar to action types 410 of FIG. 4A, and the previous description may apply. The identified type of action and the content item identifiers may then further be provided to action type condition determiner 522.

Action type condition determiner 522 may, in one embodiment, determine whether a given type of action satisfies some pre-determined criteria/condition(s). For instance, action type condition determiner 522 may determine whether the type of action performed to a given content item is one that could impact a search index. For example, an act of deleting a content item may impact a search index because that content item, in response to being deleted, should not appear as a result to a query, where the query obtains results by analyzing the search index. If action type condition determiner 522 determines that the type of action associated with a given content item identifier's content item satisfies the condition, then the content item identifier, and the corresponding action type may be provided to list of content items determiner 524. However, if the action type is one that does not satisfy the condition(s) of action type condition determiner 522, then that corresponding action may not be processed any further by filter generation system 320, as that action will not impact the search index.

List of content items determiner 524, in one embodiment, may access content item/hash function database 512 to determine a list of content items that includes the content item identifier provided from action type condition determiner 522. For instance, if a first content item has had a deletion action performed thereto, then list of content items determiner 524 may look up the content item's identifier within content item/hash function database 512. List of content items determiner 524 may then obtain an indication of the list of content items that that content item identifier is, if at all, included within. As mentioned above, in some embodiments, the list of content items may correspond to a Bloom Filter, and thus the determination of whether or not the content item identifier is included within one of the lists of content items stored by data store 514 may be performed with a high probability (e.g., zero false negatives, minimal false positives). Upon receiving an indicator of the list of content items associated with a given content item identifier, list of content items determiner 524 may provide the indicator to list of content items data store 514, as well as, or alternatively, to list of content items retriever 526. List of content items retriever 526 may then retrieve the list of content items from list of content items data store 514. Furthermore, list of content items determiner 524 may provide the content item identifier(s) whose actions satisfy the condition(s) of action type condition determiner 522 to content item membership predictor 528.

Content item membership predictor 528 may obtain a list of content items that a given content item identifier should exist within, as well as a given content item identifier associated with an action that satisfies a condition of action type condition determiner 522. Content item membership predictor 528 may then be configured to determine whether that list of content items includes that content item identifier. For instance, content item membership predictor 528 may implement the Bloom Filter's probabilistic nature in that content item identifiers included within the listing of content items on the search index should return zero false negatives and a minimal amount of false positives. If so, then content item membership predictor 528 may output an update notification. If not, then content presence detector 528 may output no update notification.

Therefore, filter generation system 320 may be operable to generate and store one or more lists of content items. Each list of content items may include one or more content item identifiers that are associated with content items likely included within a search index's one or more posting lists. Furthermore, filter generation system 320 may be configured to filter out irrelevant event data to obtain filtered event data only including actions that will impact the search index's posting lists. This filtration process may occur by determining whether a particular action represented by the event data satisfies some pre-determined condition (e.g., corresponds to a delete event), and whether the content item that the action is performed to has a content item identifier included within one of the lists of content items.

Figure 5B:
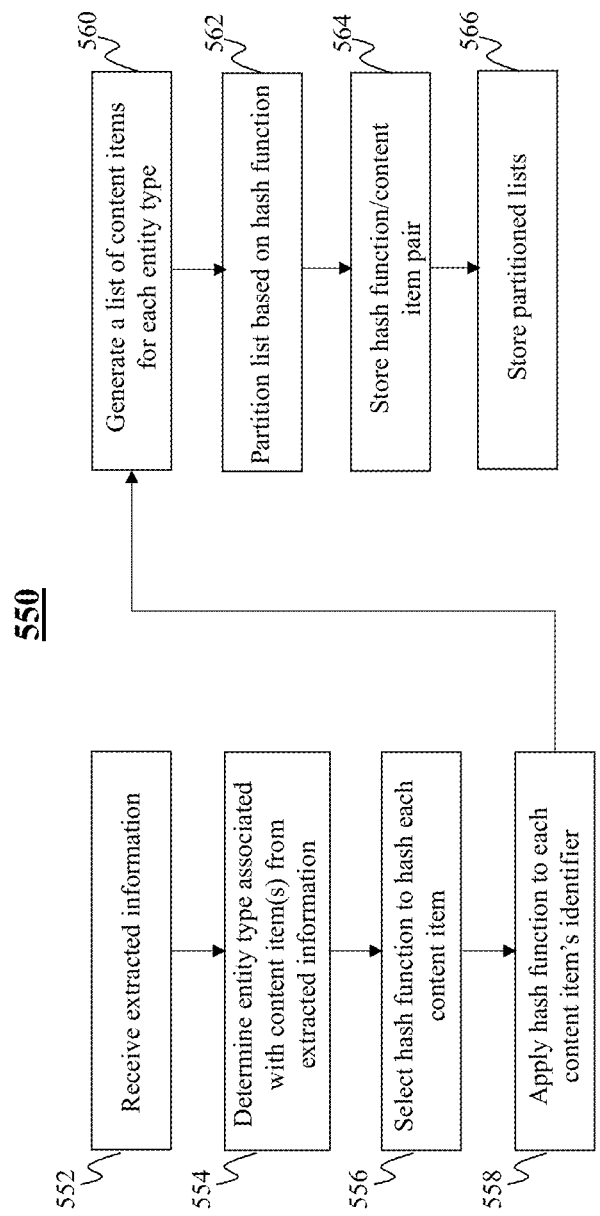
FIG. 5B is an illustrative flowchart of an exemplary process for generating a list of content items based on extracted information, in accordance with various embodiments of the present teaching.

FIG. 5B is an illustrative flowchart of an exemplary process for generating a list of content items based on extracted information, in accordance with various embodiments of the present teaching. Process 550 may, in a non-limiting embodiment, may begin at step 552. At step 552, extracted information may be received. For instance, extracted entity content item receiver 500 may receive the extracted information. In some embodiments, the extracted information may include information regarding an entity that was extracted from a content item, a content item identifier representing the content item that had the entity extracted therefrom, and temporal metadata indicating a time and/or epoch during which the action occurred. At step 554, an entity type associated with the content item(s) from the extracted information may be determined. For instance, entity type identifier 502 may identify a type of entity that the extracted entity corresponds to. Entity type identifier 502 may, in some embodiments, employ entity types 504 to determine the type of entity. In some embodiments, entity type identifier 502 may employ MapReduce functionality, as known to those of ordinary skill in the art. At step 556, a hash function may be selected to hash each content item. For example, hash function selector 506 may select one of hash functions 510 to use for hashing a corresponding content item's identifier into one or more data buckets.

At step 558, the hash function may be applied to each content item's identifier. For example, the selected hash function 510 may be used to hash a content item identifier associated with a given content item into one of a plurality of data buckets. Hash function applier 508 may apply the selected hash function 510 to a given content item's identifier to assign that content item's identifier to a particular data bucket.

At step 560, a list of content items may be generated for each entity type. For instance, list of content items generator 530 may generate a different list of content items for each identified entity type. For example, there may be separate lists of content items for such entities as, but not limited to, receipts, coupons, contact names, etc. In some embodiments, each list of content items may be formed in a similar manner as a posting list for a search index. For instance, a search index may include one or more posting lists, where each posting list is associated with a different semantic entity, and includes a ranked list of content item identifiers. The content item identifiers are ranked based on those content item identifier's corresponding content item's relevancy to that posting list's semantic entity. The list of content items generated by list of content items generator 530 may be substantially similar with the exception that the ranking of the content item identifiers, and thus the relevancy scores, may not be necessary.

At step 562, a list of content items may be partitions based on a hash function. For instance, in order to ensure scalability of the lists of content items, the list may be partitioned into one or more shards to reduce a total digital footprint of a given list, and thus decrease latency. In some embodiments, the lists of content items may be partitioned by randomly, via a hash function application, each content item identifier to a data bucket, and associated that data bucket with a particular list of content items. This may include having a single entity be represented by two or more lists of content items, each having one or more content item identifiers. Thus, to determine whether a content item identifier is included within a list of content items, that content item identifier's corresponding hash function mapping is identified from content item/hash function database 512, to determine the hash function associated with a given content item identifier.

At step 564, the hash function/content item pair may be stored. For instance, as described above, a given content item identifier may have a hash function 510 selected therefore by hash function selector 506. The hash function selected for a given content item identifier may then be stored within database 512 for future retrieval and identification of the content item identifier's corresponding list of content items. The partitioned lists of content items may then, at step 566, be stored. For instance, each list of content items, partitioned or not, may be stored within list of content items data store 514.

Figure 5C:
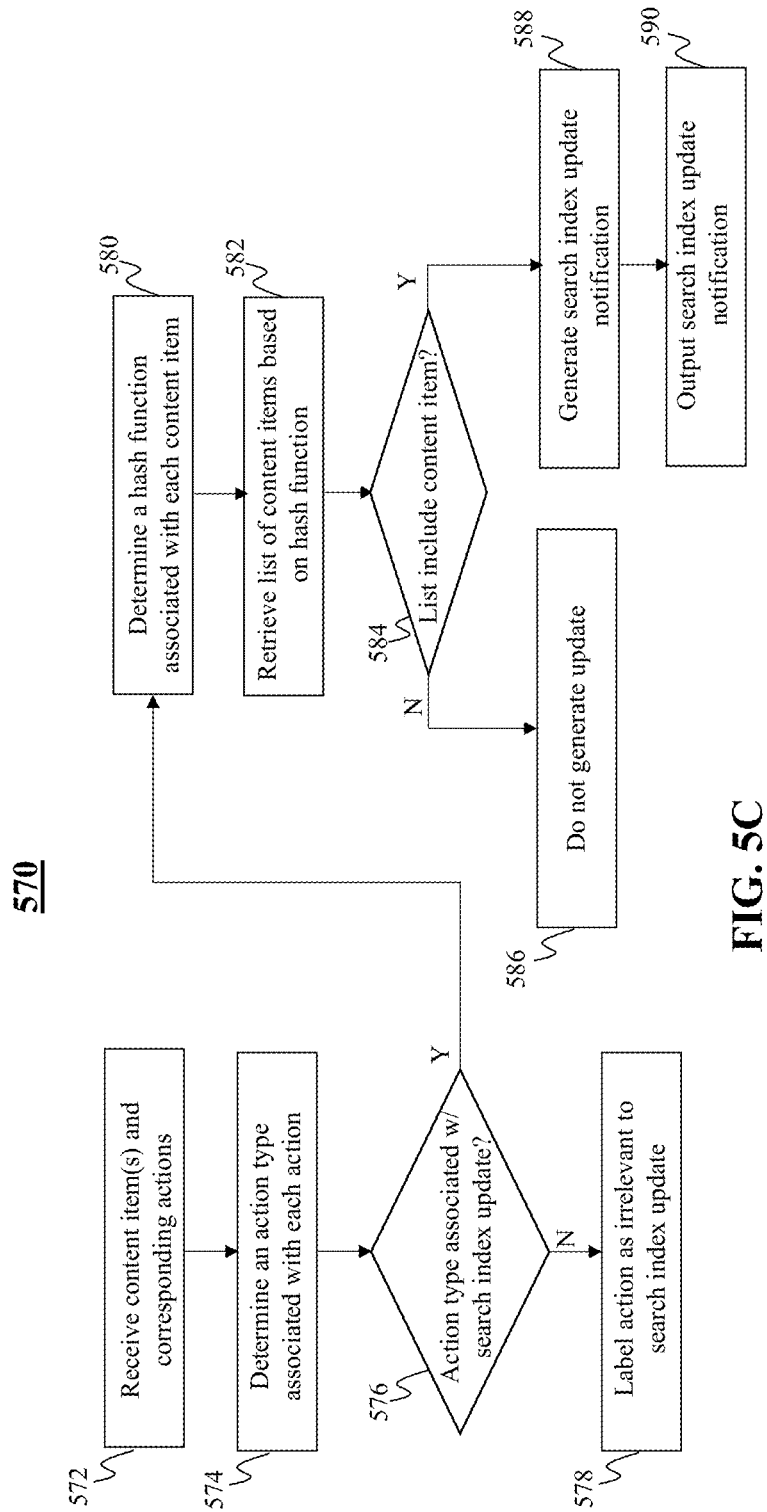
FIG. 5C is an illustrative flowchart of an exemplary process for analyzing a content list and an action performed to a content item to determine whether to generate an update for a search index, in accordance with various embodiments of the present teaching.

FIG. 5C is an illustrative flowchart of an exemplary process for analyzing a content list and an action performed to a content item to determine whether to generate an update for a search index, in accordance with various embodiments of the present teaching. Process 570, in a non-limiting embodiment, may begin at step 572. At step 572, one or more content items and corresponding actions performed thereto may be received. For instance, the actions may be those represented by the event data received for a particular epoch. The content item identifiers may thus represent the content items that the actions were performed thereto. In one embodiment, the content item identifiers and actions may be received by actionable content item receiver 516.

At step 574, an action type associated with each action may be determined. For instance, action type identifier 518 may determine an action type 520 associated with each action received by actionable content item receiver 516. At step 576, a determination may be made as to whether the action type is associated with a search index update. For instance, certain actions performed to content items may impact that content items status/presence within a search index's posting list. Therefore, if the type of action performed to a content item satisfies a pre-determined condition, then this may indicate that the action would affect one or more search index posting lists. In some embodiments, action type condition determiner 522 may determine whether the action type is associated with a search index update.

If, at step 576, it is determined that the action type is not associated with a search index update (e.g., does not satisfy a pre-determined condition), then process 570 may proceed to step 578. At step 578, the action may be labeled as irrelevant to search index updates.

If, however, at step 576 it is determined that the action type is associated with a search index update, (e.g., satisfies a pre-determined condition), then process 570 may proceed to step 580. At step 580, a hash function associated with each content item may be determined. For instance, list of content items determiner 524 may receive the content item identifier(s) associated with actions that satisfy the pre-determined condition (e.g., impact the search index), and may access content item/hash function database 512 to identify the corresponding list of content items associated with that/those content item identifier(s). At step 526, the list of content items may be retrieved based on the hash function. For instance, based on the hash function associated with a given content item identifier, as stored within content item/has function database 512, list of content items retriever 526 may retrieve a corresponding list of content items associated with the given content item identifier.

At step 584, a determination may be made as to whether the list of content items retrieved includes the content item identifier. For instance, content item membership predictor 528 may receive the list of content items and may receive the content item identifier, and may determine whether the content item identifier is included within the list. As the list of content items may correspond to a Bloom Filter's list, the determination at step 584 may generate a result with a high probability of accuracy (e.g., zero false negatives, minimum false positives). If, at step 584, it is determined that the list of content items does not include the content item identifier, then process 570 may proceed to step 586.

If, however at step 584, it is determined that the list of content items includes the content item identifier, then process 570 may proceed to step 588. At step 588, a search index update notification may be generated. At step 590, the search index update notification may be output. The search index update notification may indicate to search index update system 330 that an update to a posting list, or lists, of the search index is to occur in accordance with the action associated with the content item identifier. For example, the notification may be for search index update system to cause the content item identifier to be deleted from a posting list based on that content item having had a deletion action performed thereto by a user.

Figure 6A:
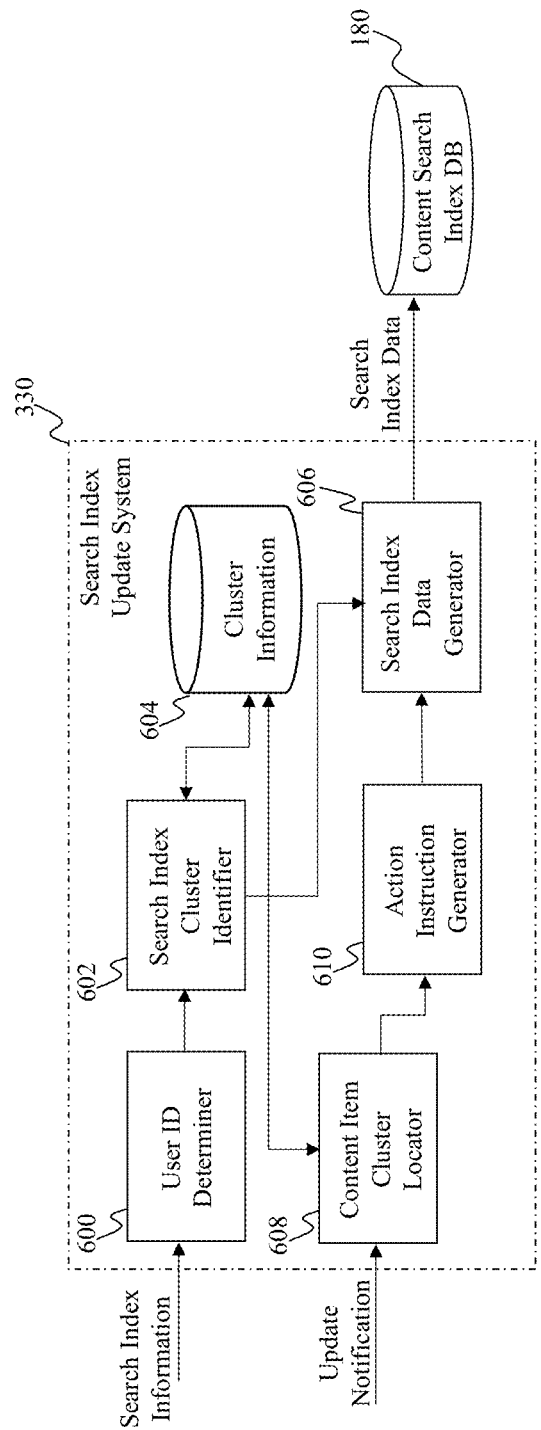
FIG. 6A is an illustrative diagram of an exemplary search index update system, in accordance with various embodiments of the present teaching.

FIG. 6A is an illustrative diagram of an exemplary search index update system, in accordance with various embodiments of the present teaching. Search index update system 330 may include a user ID determiner 600, a search index cluster identifier 602, a search index data generator 606, a content item cluster locator 608, and an action instruction generator 610. In some embodiments, search index update system 330 may also include a cluster information database 604. In some embodiments, each of user ID determiner 600, search index cluster identifier 602, search index data generator 606, content item cluster locator 608, and action instruction generator 610 may each be implemented via one or more computer program instructions stored within memory 304 of search index update system 330. For instance, processor(s) 302 of search index update system 330 may be configured to execute one or more computer program instructions stored within memory 304 of search index update system 330 to cause the functionalities associated with one or more of user ID determiner 600, search index cluster identifier 602, search index data generator 606, content item cluster locator 608, and action instruction generator 610 to be performed.

User ID determiner 600, in one embodiment, may be configured to receive the search index information obtained from content feed analysis system 310. The search index information may correspond to an update to, or a newly generated, search index for a particular user. User ID determiner 600 may determine the corresponding user associated with the update to and/or updated search index based on the search index information. The search index information may include a user ID associated with the particular user account that the content item actions were performed to. For example, if the search index corresponds to an email search index, then the user ID determined by user ID determiner 600 may correspond to an email address and/or account identifier for a particular individual's email service (e.g., email service hosted by one of content feeds 160). User ID determiner 600 may provide the user ID information to search index cluster identifier 602.

Search index cluster identifier 602, in one embodiment, may determine a particular cluster that the search index is located on by accessed cluster information database 604. For instance, there may be a plurality of search indices distributed about a plurality of nodes within a distributed system. The location of each search index within the distributed system may be stored by cluster information database 604. Therefore, upon identifying the user ID that the search index update is to be performed to, the corresponding node (e.g., computing system) within the distributed system that the search index is stored on may be provided to search index data generator 606.

Content item cluster locator 608 may, in some embodiments, be configured to locate a particular list of content items within a distributed system. Persons of ordinary skill in the art will recognize that the search indices may, in some embodiments, be co-located within a single computing device and/or more generally may not be stored within a distributed system, and the aforementioned is merely exemplary. Content item cluster locator 608 may receive the update notification from filter generation system 320. In response, content item cluster locator 608 may determine, using cluster information database 604, a location (e.g., an IP address) of where a computing system that the corresponding list of content items is stored. For instance, based on the user ID associated with the search index to be updated, the computing system within a distributed system that stored the search index for that user ID may be determined.

Action instruction generator 610 may be configured to generate an instruction to update the search index based on the corresponding update information. The instruction may indicate an action to be performed, the content item identifier that the action is to be performed to, the posting list(s) that the content item identifier is/are included within, as well as the location of the posting list. For example, the instruction may indicate that a document ID of an email that has been deleted form a user's email account inbox is to be deleted from one or more posting lists within that user's email search index.

Search index data generator 606 may be configured to generate the updated search index data and provide that updated search index data to content search index database 180. For instance, the search index data may represent the search index upon the action being performed to that content item identifier (e.g., a posting list with a deleted email's ID removed).

FIG. 6B is an illustrative flowchart of an exemplary process for generating update instructions for a search index, in accordance with various embodiments of the present teaching. Process 650, in a non-limiting embodiment, may begin at step 652. At step 652, a notification of one or more content item identifiers to be updated may be received. At step 654, an action to be performed to the one or more content item identifiers may be determined. At step 656, a location of a search index including the one or more content item identifiers may be determined. For instance, a computing system/device within a cluster of computing systems/devices (e.g., a distributed computing system) may be determined based on information stored within cluster information database 604. At step 658, an update instruction for a search index may be generated. For instance, action instruction generator 610 may generate an instruction to update a search index by causing an action to be performed to a content item identifier within a search index's posting list. At step 660, the updater instruction may be output to the search index. For instance, based on the determined location of the search index, the update (e.g., search index data representing the search index having the action performed to the content item's identifier) may be output to content search index database 180.

Figure 7:
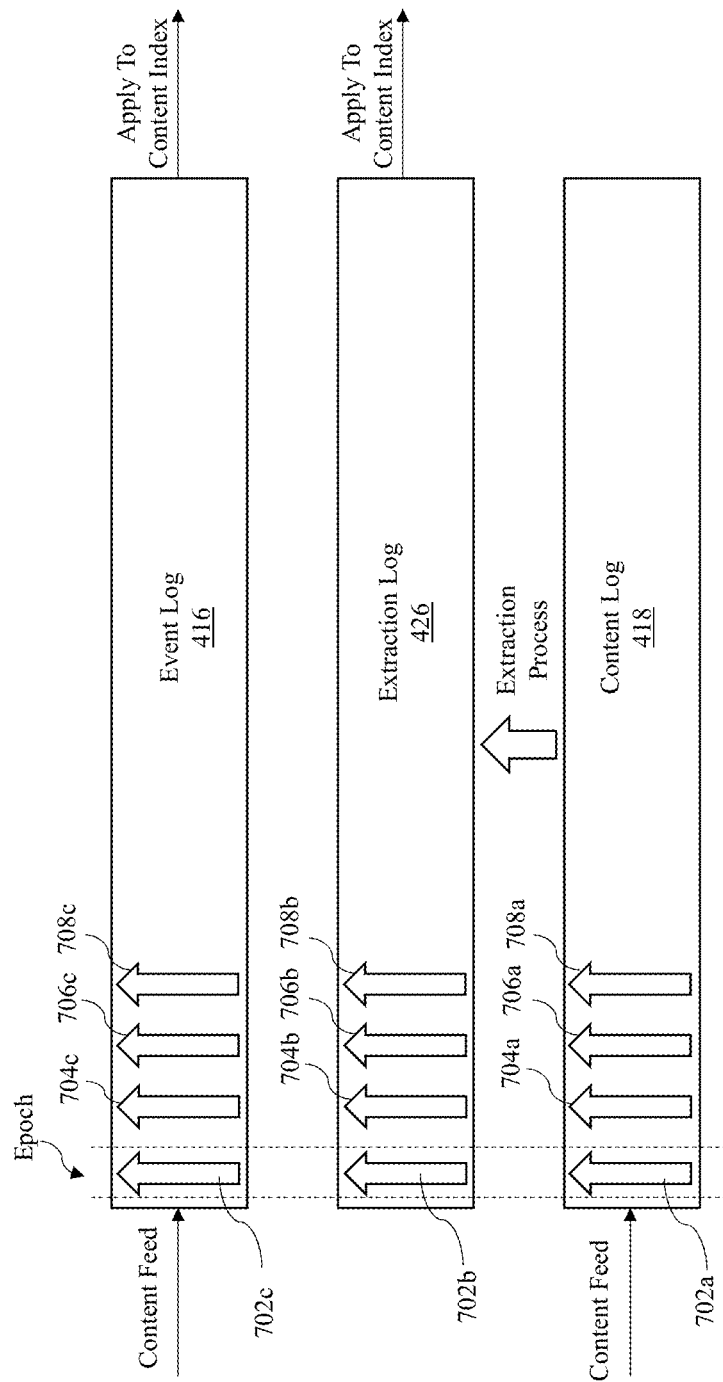
FIG. 7 is an illustrative diagram of an exemplary content log, extraction log, and event log grouped into epochs, in accordance with various embodiments of the present teaching.

FIG. 7 is an illustrative diagram of an exemplary content log, extraction log, and event log grouped into epochs, in accordance with various embodiments of the present teaching. As illustrated in FIG. 7, content log 418 is populated via a content feed 160, as described above with reference to FIG. 4A. In some embodiments, content item data representing one or more content items is received by content grid 140 from one or more content feeds 160. The content item data is received during various epochs. Each epoch may correspond to a predefined amount of time such as, for example, one hour intervals. Content log 418 may be a log-structured data structure organized into directories represented by epochs 702a-708a. Each of epochs 702a-708a may represent a substantially similar amount of time. Content item data received by a content feed 160 may be stored within entries to the data structure for the epoch with which the content items were received. As an illustrative example, epoch 702a may correspond a temporal duration beginning at time $t_1$ and ending at time $t_2$. If a new email is received at time t, where $t_1 \le t \le t_2$, then that email will be stored within an entry to content log 418 for epoch 702a. Thus, each epoch 702a-708a is populated with content item data representing content items received during that epoch.

Extraction log 426, as mentioned above, and similarly to content log 418, may also correspond to a log-structured data structure. Extraction log 426 may similarly be segmented into epochs 702b-708b, where each of epochs 702b-708b correspond to a same temporal duration as that of epochs 702a-708a. In extraction log 426, information extracted from one or more content items may be stored. For instance, an extraction process, such as a semantic entity analysis, may be performed to each content item to determine what, if any, semantic entities are includes and/or represented by that content item. If a semantic entity is determined to be present, then information associated with the entity is extracted from that content item. For example, if an email includes a digital receipt, then the digital receipt and/or keyword "receipt" may be extracted from the email. However, the number of content items received may be significantly larger than the number of content items having extractable information. Therefore, while still large (e.g., 1 million documents), the information stored within extraction log 426, in one embodiment, may be less than the information stored within content log 418. Furthermore, extracted entity information may be stored within a particular epoch during which the content item, with which the information was extracted from, was received. Using the aforementioned example, the email including a digital receipt received at time t may cause entity information to be extracted for that email and stored within extraction log 426 within epoch 702b, which also correspond a temporal duration beginning at time $t_1$ and ending at time $t_2$. However, in some embodiments, the extraction process may cross over epochs. For instance, if time t is substantially equal to $t_2$ than the extracted entity information may be stored within a subsequent epoch, epoch 704b. However, each entry within extraction log may include the extracted entity information, a content item identifier representing a content item that the entity information was extracted from, and temporal information indicating one or more of when the content item was received and when entity information was extracted.

Extraction log 426 may also be used to generate and/or update a content search index. A search index, for example, may include one or more posting lists. Each posting list may be associated with a particular semantic entity—such as the semantic entities extracted from some of the content items received and stored within content log 418. A posting list may correspond to a ranked list of content item identifiers, where the list is ranked based on a relevancy of a content item associated with a content item identifier to that posting list's entity. Using the example entity of "coupons," and the example content items as emails, a posting list for the entity coupons would include a listing of content item identifiers ranked inversely such that the top ranked content item identifier has a largest relevancy score (e.g., indicating how relevant that content item identifier's corresponding content item is to a query term "coupon"). Thus, each time a content item is determined to include entity information for an existing or new entity, a relevancy score is determined for that content item with respect to the entity, and the content item's identifier is placed within the search index's posting list for that entity in a position ranked in accordance with the relevancy score that was determined and the other relevancy scores.

Additionally, extraction log 426 may also be employed to generate a list of content items, such as a list of content items for a persistent Bloom Filter. In this particular scenario, the Bloom Filter may maintain a list of all content item identifiers that are included within a search index's posting list. In some embodiments, multiple lists corresponding to multiple Bloom Filters may be employed, where each Bloom Filter list is associated with a different entity, similarly to the posting lists. Thus, as an illustrative example, if a posting list for the entity "coupons" exists within content search index database 180, then a list of content items for a "coupon" entity Bloom Filter may also be generated and stored with extraction log 426 and/or event log 416.

Typically, content log 418, extraction log 426, and event log 416, and the corresponding one or more Bloom Filter lists, are co-located on a same platform, such as content grid 140. However, in some embodiments, event log 416, content log 418 and extraction log 426, and/or the Bloom Filter lists, may be located on separate platforms. For example of the latter scenario, event log 416 may be a part of content feed 160, while content log 418 and extraction log 426 may be part of content grid 140.

Event log 416, similarly to extraction log 426 and content log 418, may be a log-structured data structure organized into epochs 702c-708c. Event data representing actions performed to one or more content items may be received from content feeds 160 and may be stored within an epoch 702c-708c based on a timestamp associated with the action. The timestamp may, in one embodiment, indicate a time that the action was performed to a content item. For instance, if an action performed to a content item occurred at time t, then the event data representing that action may be stored within epoch 702c. However, in some embodiments, actions performed to content items may occur at a later time than a time when the content item was received. For example, a content item may be received during epoch 702a, but an action may be performed to that content item during epoch 706c.

When event data is received from a content feed, a determination is made as to whether the action or actions represented by the event data correspond to an action type that may impact a posting list. For example, an action of reading an email may not affect a posting list, whereas an action of deleting an email will impact a posting list. In the latter scenario, a deleted email should no longer appear in a list of search results when a query is submitted to the email service's search engine. Thus, the document ID representing that email should be removed from any posting lists.

If the action satisfies some pre-determined criteria (e.g., represents an action that will impact one or more posting lists of a search index), then a determination may be made as to whether that content item's identifier is included within one of the Bloom Filter lists. As logs 416, 418, and 426 are log-structured, the Bloom Filter is persistent such that the lists remain even after the circular buffer overwrites, in one embodiment. If the content item identifier associated with the content item that the action was performed to does, in fact, reside within one of the Bloom Filter lists, then a search index update instruction is generated and sent to the content search index database 180 to update the posting list(s). By only accessing content search index database 180 for events that satisfy certain criteria and exist within a Bloom Filter list, a minimal number of calls to content search index database 180, which resides on an external platform from content grid 140, may be made. This may improve system performance, minimize latency, and improve overall user experience by providing a search index that is continually updated and accurate.

Figure 8:
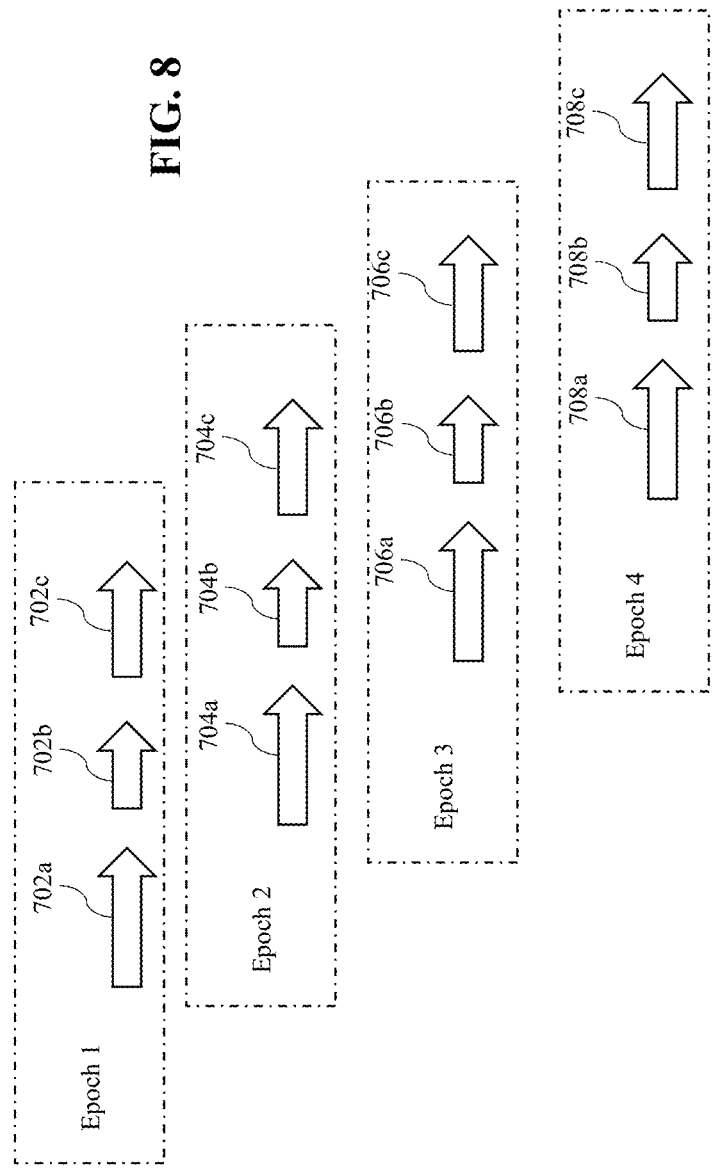
FIG. 8 is an illustrative diagram of an exemplary process flow for epochs of the content log, extraction log, and event log, in accordance with various embodiments of the present teaching.

FIG. 8 is an illustrative diagram of an exemplary process flow for epochs of the content log, extraction log, and event log, in accordance with various embodiments of the present teaching. As seen in FIG. 8, epochs from different logs (e.g., content log 418, extraction log 426, and event log 416) may overlap one another. However, epoch 702a, 704a, 706a, and 708a may each be sequential. The same concept applies to epochs 702b-708b and 702c-708c. Therefore, during Epoch 1, epochs 702a-c occur, during Epoch 2, epochs 704a-c occur, and so on.

Figure 9:
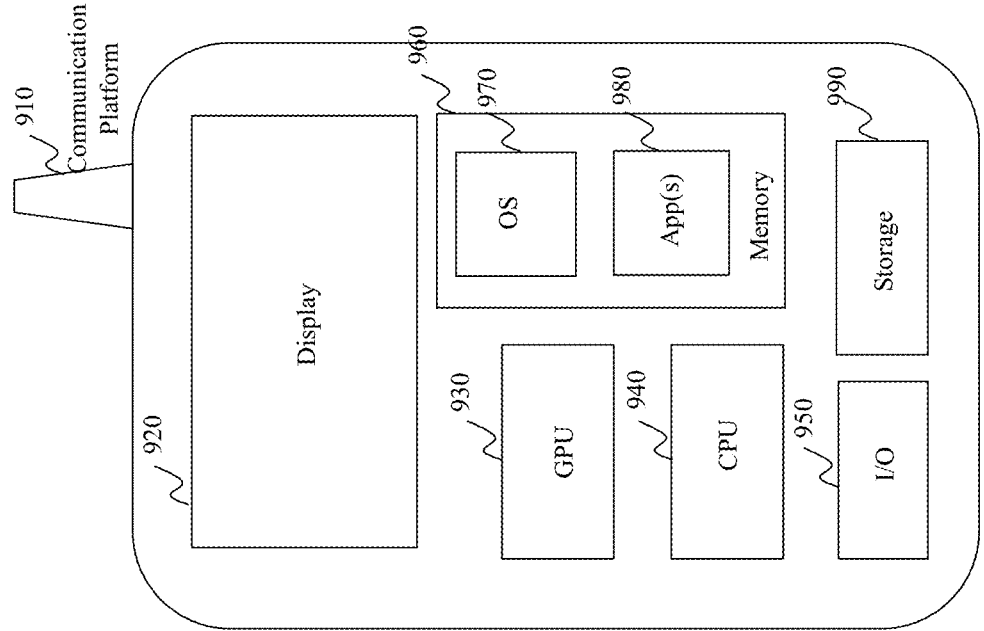
FIG. 9 is an illustrative diagram of an exemplary mobile device architecture that may be used to realize a specialized system implementing the present teaching in accordance with various embodiments.

FIG. 9 is an illustrative diagram of an exemplary mobile device architecture that may be used to realize a specialized system implementing the present teaching in accordance with various embodiments. In this example, the user device on which the search index update via filtration systems and methods is implemented corresponds to a mobile device 900, including, but not limited to, a smart phone, a tablet, a music player, a handled gaming console, a global positioning system (GPS) receiver, and a wearable computing device (e.g., eyeglasses, wrist watch, etc.), or in any other form factor. Mobile device 900 may include one or more central processing units ("CPUs") 940, one or more graphic processing units ("GPUs") 930, a display 920, a memory 960, a communication platform 910, such as a wireless communication module, storage 990, and one or more input/output (I/O) devices 940. Any other suitable component, including but not limited to a system bus or a controller (not shown), may also be included in the mobile device 900. As shown in FIG. 9 a mobile operating system 970 (e.g., iOS, Android, Windows Phone, etc.), and one or more applications 980 may be loaded into memory 960 from storage 990 in order to be executed by the CPU 940. The applications 980 may include a browser or any other suitable mobile apps for carrying out search index update via filtration on mobile device 900. User interactions with the content may be achieved via the I/O devices 940 and provided to the content grid 140 via network(s) 120.

To implement various modules, units, and their functionalities described in the present disclosure, computer hardware platforms may be used as the hardware platform(s) for one or more of the elements described herein (e.g., content grid 140). The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 10:
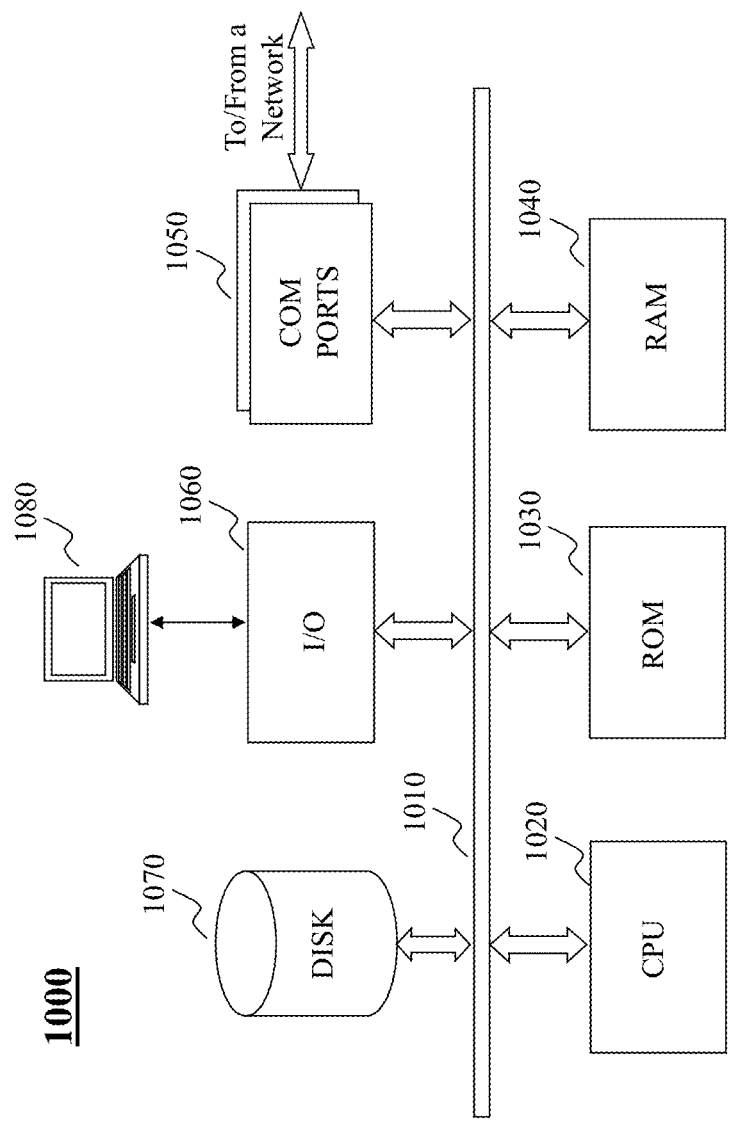
FIG. 10 is an illustrative diagram of an exemplary computing device architecture that may be used to realize a specialized system implementing the present teaching in accordance with various embodiments.

FIG. 10 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1000 may be used to implement any component of search index update via filtration techniques, as described herein. For example, the search index update via filtration system as described herein may be implemented on a computer such as computer 1000, via its hardware, software program, firmware, or a combination thereof. Although only one such computer is shown, for convenience, the computer functions relating to search index update via filtration as described herein may be implemented in a distributed fashion on a number of similar platforms, to distribute the processing load.

Computer 1000, for example, includes COM ports 1050 connected to and from a network connected thereto to facilitate data communications. Computer 1000 also includes a central processing unit (CPU) 1020, in the form of one or more processors, for executing program instructions. The exemplary computer platform includes an internal communication bus 1010, program storage and data storage of different forms (e.g., disk 1070, read only memory (ROM) 1030, or random access memory (RAM) 1040), for various data files to be processed and/or communicated by computer 1000, as well as possibly program instructions to be executed by CPU 1220. Computer 1000 also includes an I/O component 1060, supporting input/output flows between the computer and other components therein such as user interface elements 1080. Computer 1000 may also receive programming and data via network communications.

Hence, aspects of the methods of search index update via filtration and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with search index update systems. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the search result retrieval techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method implemented on at least one machine comprising at least one processor, memory, and a communication platform connected to a network for updating a search index, the method comprising:
    obtaining event data representing actions performed on content items managed via the search index;
    filtering the event data based on pre-determined criteria to generate updated event data, wherein the updated event data represents relevant actions performed on at least one of the content items and are associated with the search index, and wherein the pre-determined criteria comprises (i) a list of content items represented within the search index including the at least one of the content items, and (ii) an action associated with the at least one of the content items corresponds to one of the relevant actions; and
    generating an updated search index based on the updated event data to reflect the action associated with the at least one of the content items.

2. The method of claim 1, wherein filtering comprises:
retrieving the list of content items represented within the search index;
determining that the list of content items comprises the at least one of the content items; and
generating the updated event data.

3. The method of claim 1, wherein retrieving the list of content items comprises:
determining, for each of the actions, a corresponding identifier associated with a content item; and
identifying the list of content items from a plurality of lists of content items based on the identifier.

4. The method of claim 1, further comprising:
receiving content items from one or more content feeds;
extracting a semantic entity for at least one of the content items;
adding an identifier associated with the at least one of the content items to a list of content items; and
generating the search index comprising one or more lists of identifiers ranked based on a relevancy of a corresponding content item to the semantic entity.

5. The method of claim 1, wherein obtaining the event data comprises:
determining an epoch start time;
receiving, from one or more content feeds, the event data;
determining an epoch end time; and
storing the event data within an entry in an event log, the entry having a temporal duration equal to a difference between the epoch end time and the epoch start time.

6. The method of claim 1, wherein the event data is stored within an event log located on a content grid, and the search index is located on a remote system, the method further comprising:
sending the updated search index to the remote system to perform an update to the search index.

7. The method of claim 6, wherein the event log, a content log, and an extraction log are located on the content grid, the content log being configured to store information associated with the content items, and the extraction log being configured to store entities extracted from at least some of the content items.

8. The method of claim 7, wherein, the content log, the extraction log, and the event log are log-structured file systems, filtering further comprises:
generating the pre-determined criteria, the pre-determined criteria comprising a Bloom Filter indicating a list of content items represented within the search index; and
applying the Bloom Filter to the event data to generate the updated event data.

9. A method implemented on at least one machine comprising at least one processor, memory, and a communication platform connected to a network for updating a search index, the method comprising:
obtaining event data representing actions performed on a plurality of content items managed via the search index;
filtering the event data based on pre-determined criteria to generate updated event data, wherein the updated event data represents relevant actions performed on at least one of the plurality of content items and are associated with the search index, and wherein the pre-determined criteria comprises (i) a list of content items represented within the search index including the at least one of the plurality of content items, and (ii) an action associated with the at least one of the plurality of content items corresponds to one of the relevant actions; and
sending the updated event data to a content grid for generating an updated search index.

10. The method of claim 9, wherein filtering comprises:
retrieving the list of content items represented within the search index;
determining that the list of content items comprises the at least one of the plurality of content items; and
generating the updated event data, wherein the search index is to be updated to reflect the action associated with the at least one of the plurality of content items.

11. The method of claim 9, wherein obtaining the event data comprises:
determining an epoch start time and an epoch end time associated with each of the actions represented by the event data; and
providing the event data to the content grid for storing within an entry of an event log, the entry having a temporal duration equal to a difference between the epoch end time and the epoch start time and including each action that occurred during the temporal duration.

12. The method of claim 9, wherein filtering comprises:
generating the pre-determined criteria, the pre-determined criteria further comprising a Bloom Filter indicating the list of content items represented within the search index; and
applying the Bloom Filter to the event data to generate the updated event data.

13. A system for updating a search index, comprising:
memory comprising one or more computer program instructions; and
at least one processor configured, upon execution of the one or more computer program instructions, to:
obtain event data representing actions performed on a plurality of content items managed via the search index;
filter the event data based on pre-determined criteria to generate updated event data, wherein the updated event data represents relevant actions performed on at least one of the plurality of content items and are associated with the search index, and wherein the pre-determined criteria comprises (i) a list of content items represented within the search index including the at least one of the plurality of content items, and (ii) an action associated with the at least one of the plurality of content items corresponds to one of the relevant actions; and
generate an updated search index based on the updated event data to reflect the action associated with the at least one of the plurality of content items.

14. The system of claim 13, wherein the at least one processor, upon execution of the one or more computer program instructions associated with the event data being filtered, is configured to:
retrieve the list of content items represented within the search index;
determine that the list of content items comprises the at least one of the plurality of content items; and
generate the updated event data.

15. The system of claim 13, wherein the at least one processor, upon execution of the one or more computer program instructions comprising the list of content items being retrieved, is configured to:
determine, for each of the actions, a corresponding identifier associated with a content item; and
identify the list of content items from a plurality of lists of content items based on the identifier.

16. The system of claim 13, wherein the at least one processor, upon execution of the one or more computer program instructions, is further configured to:
- receive content items from one or more content feeds;
- extract a semantic entity for at least one of the content items;
- add an identifier associated with the at least one of the content items to the list of content items; and
- generate the search index comprising one or more lists of identifiers ranked based on a relevancy of a corresponding content item to the semantic entity.

17. The system of claim 13, wherein the at least one processor, upon execution of the one or more computer program instructions comprising the event data being obtained, is configured to:
- determine an epoch start time;
- receive, from one or more content feeds, the event data;
- determine an epoch end time; and
- store the event data within an entry in an event log, the entry having a temporal duration equal to a difference between the epoch end time and the epoch start time.

18. The system of claim 13, wherein the event data is stored within an event log located on a content grid, and the search index is located on a remote system, the at least one processor, upon execution of the one or more computer program instructions, is further configured to:
- send the updated search index to the remote system to perform an update to the search index.

19. The system of claim 18, wherein the event log, a content log, and an extraction log are located on the content grid, the content log being configured to store information associated with the plurality of content items, and the extraction log being configured to store entities extracted from at least some of the plurality of content items.

20. The system of claim 19, wherein, the content log, the extraction log, and the event log are log-structured file systems, the at least one processor, upon execution of the one or more computer program instructions comprising the event data being filters, is configured to:
- generate the pre-determined criteria, the pre-determined criteria comprising a Bloom Filter indicating the list of content items represented within the search index; and
- apply the Bloom Filter to the event data to generate the updated event data.

21. A system for updating a search index, comprising:
- memory comprising one or more computer program instructions; and
- at least one processor configured, upon execution of the one or more computer program instructions, to:
  - obtain event data representing actions performed on a plurality of content items managed via the search index;
  - filter the event data based on pre-determined criteria to generate updated event data, wherein the updated event data represents relevant actions performed on at least one of the plurality of content items and are associated with the search index, and wherein the pre-determined criteria comprises (i) a list of content items represented within the search index including the at least one of the plurality of content items, and (ii) an action associated with the at least one of the plurality of content items corresponds to one of the relevant actions; and
  - send the updated event data to a content grid for generating an updated search index.

22. The system of claim 21, wherein the at least one processor, upon execution of the one or more computer program instructions comprising the event data being filtered, is configured to:
- retrieve the list of content items represented within the search index;
- determine that the list of content items comprises the at least one of the plurality of content items; and
- generate the updated event data.

23. The system of claim 21, wherein the at least one processor, upon execution of the one or more computer program instructions comprising the event data being obtained, is configured to:
- determine an epoch start time and an epoch end time associated with each of the actions represented by the event data; and
- provide the event data to the content grid for storing within an entry of an event log, the entry having a temporal duration equal to a difference between the epoch end time and the epoch start time and including each action that occurred during the temporal duration.

24. The system of claim 21, wherein the at least one processor, upon execution of the one or more computer program instructions comprising the event data being filtered, is configured to:
- generate the pre-determined criteria, the pre-determined criteria comprising a Bloom Filter indicating the list of content items represented within the search index; and
- apply the Bloom Filter to the event data to generate the updated event data.

25. A non-transitory computer readable medium comprising instructions that, when executed by at least one processor of a computing system, effectuate operations comprising:
- obtaining event data representing actions performed on a plurality of content items managed via a search index;
- filtering the event data based on pre-determined criteria to generate updated event data, wherein the updated event data represents relevant actions performed on at least one of the plurality of content items and are associated with the search index, and wherein the pre-determined criteria comprises (i) a list of content items represented within the search index including the at least one of the plurality of content items, and (ii) an action associated with the at least one of the plurality of content items corresponds to one of the relevant actions; and
- generating an updated search index based on the updated event data to reflect the action associated with the at least one of the plurality of content items.

26. A non-transitory computer readable medium comprising instructions that, when executed by at least one processor of a computing system, effectuate operations comprising:
- obtaining event data representing actions performed on a plurality of content items managed via a search index;
- filtering the event data based on pre-determined criteria to generate updated event data, wherein the updated event data represents relevant actions performed on at least one of the plurality of content items and are associated with the search index, and wherein the pre-determined criteria comprises (i) a list of content items represented within the search index including the at least one of the plurality of content items, and (ii) an action associated with the at least one of the plurality of content items corresponds to one of the relevant actions; and sending the updated event data to a content grid for generating an updated search index.

\* \* \* \* \*